United States Patent
Oh et al.

(10) Patent No.: US 11,569,944 B2
(45) Date of Patent: Jan. 31, 2023

(54) METHOD FOR IDENTIFYING A RESOURCE FOR REPETITIVE TRANSMISSION

(71) Applicant: Samsung Electronics Co., Ltd., Gyeonggi-do (KR)

(72) Inventors: Jinyoung Oh, Gyeonggi-do (KR); Sungjin Park, Gyeonggi-do (KR); Taehan Bae, Gyeonggi-do (KR); Jeongho Yeo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/573,098

(22) Filed: Jan. 11, 2022

(65) Prior Publication Data
US 2022/0131654 A1   Apr. 28, 2022

Related U.S. Application Data

(63) Continuation of application No. 17/018,109, filed on Sep. 11, 2020, now Pat. No. 11,223,452, which is a
(Continued)

(30) Foreign Application Priority Data

Dec. 4, 2017   (KR) .................. 10-2017-0165445
Jan. 11, 2018   (KR) .................. 10-2018-0004009

(51) Int. Cl.
*H04L 1/18*   (2006.01)
*H04L 5/00*   (2006.01)
(Continued)

(52) U.S. Cl.
CPC .......... *H04L 1/1819* (2013.01); *H04L 1/1861* (2013.01); *H04L 5/0023* (2013.01);
(Continued)

(58) Field of Classification Search
CPC ... H04L 1/1819; H04L 5/0053; H04L 1/1861; H04L 5/0023; H04L 5/0007; H04L 1/08;
(Continued)

(56) References Cited

U.S. PATENT DOCUMENTS

2014/0254544 A1   9/2014 Kar Kin Au et al.
2016/0050658 A1   2/2016 Tabet et al.
(Continued)

FOREIGN PATENT DOCUMENTS

EP   3 714 633   9/2020
JP   6-147302   6/2017
(Continued)

OTHER PUBLICATIONS

Sony, "Discusion on the RV Sequence within Repetitions for UL Transmission without UL Grant", R1-1720462, 3GPP TSG RAN WG1 Meeting #91, Nov. 27-Dec. 1, 2017, 3 pages.
(Continued)

*Primary Examiner* — Afshawn M Towfighi
(74) *Attorney, Agent, or Firm* — The Farrell Law Firm, P.C.

(57) ABSTRACT

The disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure relates to a method and apparatus for transmitting uplink (UL) data in a wireless communication system. A method includes identifying information on a number of repetitive transmissions K,
(Continued)

redundancy version information, and period information for a grant-free uplink (UL) transmission; identifying a resource among resources for the number of repetitive transmissions as an initial transmission; and performing the initial transmission of IX data on the identified resource.

20 Claims, 11 Drawing Sheets

Related U.S. Application Data continuation of application No. 16/209,449, filed on Dec. 4, 2018, now Pat. No. 10,778,378.

(51) Int. Cl.
  *H04W 72/04* (2009.01)
  *H04W 72/12* (2009.01)
(52) U.S. Cl.
  CPC ......... *H04L 5/0053* (2013.01); *H04W 72/042* (2013.01); *H04W 72/1278* (2013.01); *H04L 5/0007* (2013.01)
(58) Field of Classification Search
  CPC .............. H04L 1/1822; H04W 72/042; H04W 72/1278
  See application file for complete search history.

(56) References Cited

U.S. PATENT DOCUMENTS

| | | | |
|---|---|---|---|
| 2018/0337752 A1* | 11/2018 | Choi | ................. H04L 1/08 |
| 2019/0132066 A1* | 5/2019 | Park | ................. H04W 76/18 |
| 2020/0003759 A1 | 1/2020 | Wang et al. | |
| 2020/0228254 A1* | 7/2020 | Ma | ................. H04L 1/1819 |

FOREIGN PATENT DOCUMENTS

| | | |
|---|---|---|
| KR | 10-1515042 | 4/2015 |
| WO | WO 2014/075558 | 5/2014 |
| WO | WO 2017/080430 | 5/2017 |
| WO | WO 2019/105314 | 6/2019 |

OTHER PUBLICATIONS

Huawei, HiSilicon, "UL Data Transmission Procedure without UL Grant", R1-1719411, 3GPP TSG RAN WG1 Meeting #91, Nov. 27-Dec. 1, 2017, 14 pages.
ZTE, Sanechips, "Remaining Details of UL Transmission without Grant", R1-1719516, 3GPP TSG RAN WG1 Meeting 91, Nov. 27-Dec. 1, 2017, 7 pages.
CATT, "RV Sequence Consideration for UL Grant-Free Transmission", R1-1720211, 3GPP TSG RAN WG1 Meeting #91, Nov. 27-Dec. 1, 2017, 3 pages.
International Search Report dated Mar. 11, 2019 issued in counterpart application No. PCT/KR2018/015224, 3 pages.
European Search Report dated Mar. 23, 2021 issued in counterpart application No. 18887163.6-1205, 5 pages.
LG Electronics, "Discussion on UL Data Transmission Procedure", R1-1717968, 3GPP TSG RAN WG1 Meeting 90bis, Oct. 9-13, 2017, 12 pages.
European Search Report dated Oct. 13, 2020 issued in counterpart application No. 18887163.6-1205, 10 pages.
Indian Examination Report dated Apr. 1, 2022 issued in counterpart application No. 202037011028, 7 pages.
Korean Office Action dated Sep. 19, 2022 issued in counterpart application No. 10-2018-0004009, 9 pages.

* cited by examiner

METHOD FOR IDENTIFYING A RESOURCE FOR REPETITIVE TRANSMISSION

CROSS-REFERENCE TO RELATED APPLICATIONS)

This application is a Continuation of U.S. application Ser. No. 17/018,109, which was filed in the U.S. Patent and Trademark Office (USPTO) on Sep. 11, 2020, which is a Continuation of U.S. application Ser. No. 16/209,449, which was filed in the USPTO on Dec. 4, 2018, issued as U.S. Pat. No. 10,778,378 on Sep. 15, 2020, and claims priority under 35 U.S.C. § 119 to Korean Patent Application Nos. 10-2017-0165445 and 10-2018-0004009, which were filed in the Korean Intellectual Property Office on Dec. 4, 2017, and Jan. 11, 2018, respectively, the entire disclosure of each of which is incorporated by reference herein in its entirety.

BACKGROUND

1. Field

The present disclosure relates generally to a wireless communication system and, in particular, to a method and apparatus for transmitting uplink (UL) data in the communication system.

2. Description of Related Art

To meet the demand for wireless data traffic, which has increased since deployment of $4^{th}$ generation (4G) communication systems, efforts have been made to develop an improved $5^{th}$ generation (5G) or pre-5G communication system. The 5G or pre-5G communication system may also be called a 'beyond 4G network' or a 'post long term evolution (UTE) system'. The 5G communication system is considered to be implemented in higher frequency (mm-Wave) bands, e.g., 60 GHz bands, in order to accomplish higher data rates. To decrease propagation loss of the radio waves and increase a transmission distance, beamforming, massive multiple-input multiple-output (MIMO), full dimensional MIMO (FIS-MIMO), array antenna, an analog beam forming, and large scale antenna techniques are being discussed for use in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CAW), reception-end interference cancellation, etc.

In the 5G system, hybrid frequency shift keying (FSK) and quadrature amplitude modulation (QAM) (FQAM) and sliding window superposition coding (SWSC) have been developed for advanced coding modulation (ACM), and filter bank multi carrier (FBMC), non-orthogonal multiple access (NOMA), and sparse code multiple access (SCMA) have been developed as advanced access technologies.

The Internet is now evolving to the Internet of things (IoT), in which distributed entities, i.e., things, exchange and process information without human intervention.

The Internet of everything (IoE), which is a combination of the IoT technology and frig data processing technology through a connection with a cloud server, has also emerged.

As technology elements, such as a "sensing technology", a "wired wireless communication and network infrastructure", a "service interface technology", and a "Security technology" have been demanded for IoT implementation, a sensor network, machine-to-machine (M2M) communication, machine type communication (MTC), etc., have been recently researched. Such an IoT environment may provide intelligent Internet technology services that creates new services and values by collecting and analyzing data generated among connected things. IoT may be applied to a variety of fields including a smart home, a smart building, a smart city, a smart car, connected cars, a smart grid, a health care, smart appliances, and advanced medical services through convergence and combination between existing information technology (IT) and various industrial applications.

Accordingly, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may be another example of the convergence between 5G technology and IoT technology.

However, in order to support various 5G technology-based services, there is a need for an efficient UL control channel transmission resource configuration method and apparatus.

SUMMARY

The present disclosure has been made to address the above-mentioned problems and disadvantages, and to provide at least the advantages described below.

More specifically, the present disclosure has been conceived to support the aforementioned various services in a next generation mobile communication system and aims to provide a method and apparatus for a terminal to perform UL data transmission without receiving separate UL scheduling information.

In accordance with an aspect of the present disclosure, a method is provided for transmitting UL data in a wireless communication system. The method includes identifying information on a number of repetitive transmissions K, redundancy version information, and period information for a grant-free uplink (UL) transmission; identifying a resource among resources for the number of repetitive transmissions as an initial transmission; and performing the initial transmission of UL data on the identified resource. The identified resource is one among first F resources, except for a predetermined number of resources, where F is a natural number. The first F resources and the predetermined number of resources are associated with redundancy version (RV) 0. A number of the first F resources and the predetermined number of resources is determined based on the number of the repetitive transmissions.

BRIEF DESCRIPTION THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
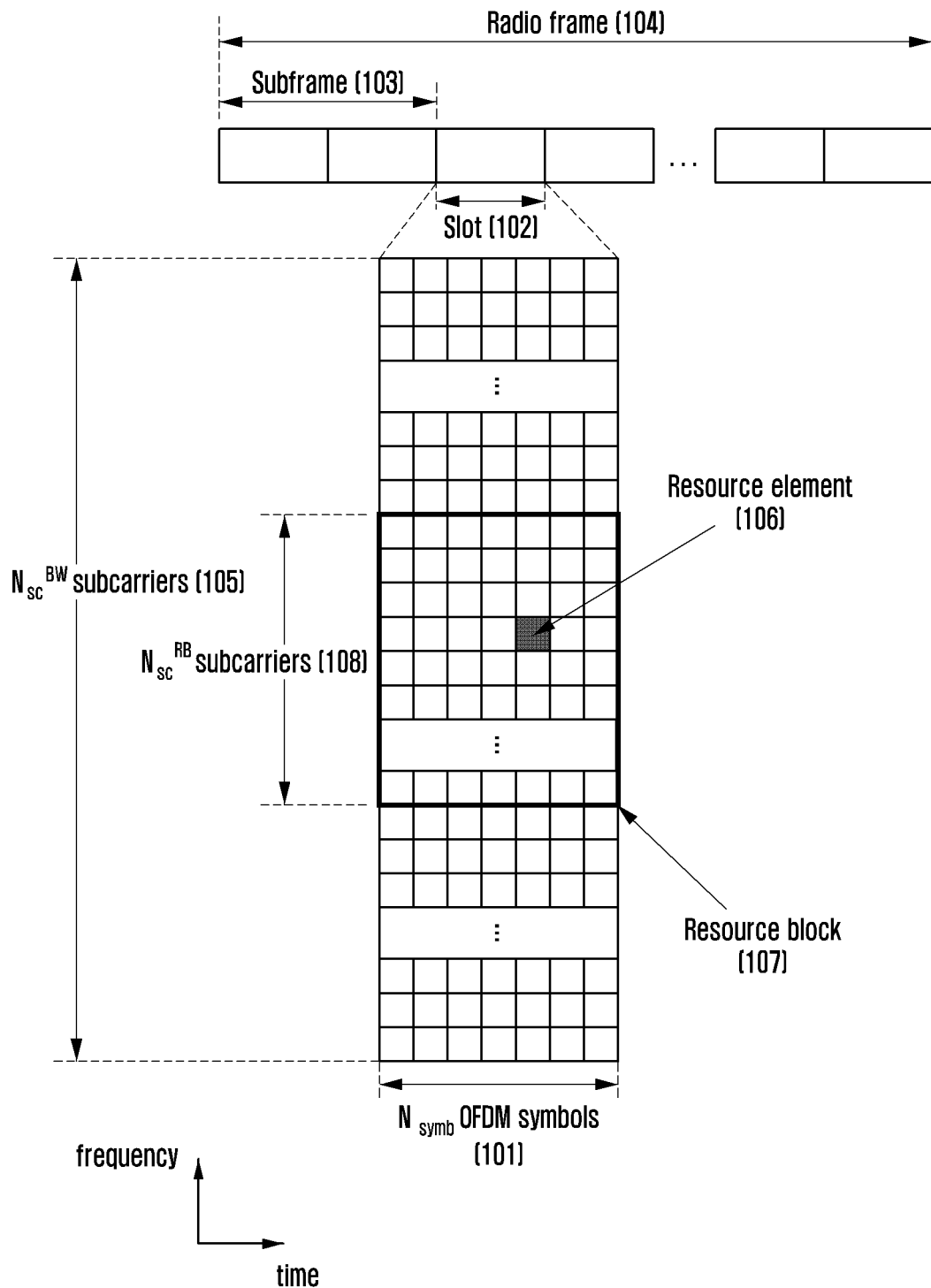
FIG. 1 illustrates a basic time-frequency resource structure for transmitting downlink (DL) data or control channels in an LTE system.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Some elements are exaggerated, omitted, or simplified in the drawings and, in practice, the elements may have sizes and/or shapes different from those shown in the drawings.

Throughout the drawings, the same or equivalent parts may be indicated by the same reference numbers.

Each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instructions that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Further, block diagrams may illustrate parts of modules, segments, or codes including at least one or more executable instructions for performing specific logic function(s). However, the functions of the blocks may be performed in a different order in several modifications. For example, two successive blocks may be performed substantially at the same time, or may be performed in reverse order according to their functions.

Herein, the term "module" may refer to a software or hardware component, such as a field programmable gate array (FPGA) or an application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more central processing units (CPUs) in a device or a secure multimedia card.

The mobile communication system has evolved to a high-speed, high-quality packet data communication system (such as high speed packet access (HSPA), LTE (or evolved universal terrestrial radio access (E-UTRA)), and LTE-Advanced (LTE-A) as defined in $3^{rd}$ Generation Partnership Project (3GPP), high rate packet data (MUD) as defined in $3^{rd}$ Generation Partnership Project-2 (3GPP2), and 802.16e defined by the Institute of Electrical and Electronics Engineers (IEEE)) capable of providing data and multimedia services beyond the early voice-oriented services.

An LTE system, as one of the representative broadband wireless communication systems, uses orthogonal frequency division multiplexing (OEDM) in the DL and single carrier frequency division multiple access (SC-FDMA) in the UL.

Herein, the term "uplink" or "UL" denotes a radio transmission path from a terminal (e.g., a UE or mobile station (MS)) to a BS (or an evolved node B (eNB)), and the term "downlink" or "DL" denotes a radio transmission path from a BS to a terminal.

Such multiple access schemes are characterized by allocating time-frequency resources for transmitting user-specific data and control information without overlapping each other, i.e., maintaining orthogonality, in order to distinguish among user-specific data and control information.

As a next generation communication system after LTE, a 5G communication system should be designed to meet various requirements of services demanded by users and service providers. The services supported by 5G systems may be categorized into three categories: enhanced mobile broadband (OMB), massive machine type communications (mMTC), and ultra-reliable and low-latency communications (URLLC). The eMBB is intended to provide exceptionally high data rate in comparison with those supported by the legacy LYE, LTE-A, and LTE-A Pro. For example, the eMBB is intended to increase a peak data rate up to 20 Gbps in a DL and 10 Gbps in a UL per BS, while also increasing the user-perceived data rate. In order to meet such requirements, signal transmission/reception technologies including a MIMO technique should be improved. The data rate requirements for the 5G communication systems may be met by use of a frequency bandwidth broader than 20 MHz in the frequency band of 3 to 6 GHz or above 6 GHz instead of the current LTE band of 2 GHz.

The MMTC is intended to support application services for IoT. In order to provide in MTC-based IoT application services effectively, massive access resources for terminals should be secured within a cell, terminal coverage and battery life span should be improved, and device manufacturing cost should be reduced. The IoT services should be designed to support a large number of terminals (e.g., 1,000,000 terminals/km$^2$) within a cell in consideration by the nature of the IoT terminals that are attached to various sensors and devices for providing a communication function. By the nature of the IoT services, the mMTC terminals are likely to be located in coverage holes, such as basements, which require broader coverage in comparison with other services being supported in the 5G communication system. The MIMIC terminals that are characterized by their low prices and battery replacement difficulty should be designed to have very long battery lifetime.

The URLLC is targeted for mission-critical cellular-based communication services such as remote robots and machinery control, industrial automation, unmanned aerial vehicles, remote health care, and emergency alert services that require ultra-low latency and ultra-high reliability. Accordingly, a URLL service requires ultra-low latency and ultra-high reliability. For example, a URLLC service should meet the requirements of air-interface latency lower than 0.5 ms and packet error rate less than or equal to $10^{-5}$. In this respect, in order to support the URLLC services, the 5G system should support transmit time intervals (TTI) shorter than those of other services and assign broad resources in the frequency band. Accordingly, the 5G system should support a short TTI for the URLLC, which is shorter than those for other services, and allocate broad resources in a frequency band to secure reliability of the communication link.

These three categories of services (re, eMBB, URLLC, and mMTC) may be multiplexed into one system. In order to meet the different service-specific requirements, the different categories of services may be transmitted/received with different transmission/reception schemes and parameters.

FIG. 1 illustrates a basic time-frequency resource structure for transmitting DL data or control channels in an LTE system.

Referring to FIG. 1, the horizontal axis denotes time, and the vertical axis denotes frequency. The smallest transmission unit in the time domain is an OFDM symbol, and $N_{symb}$ OFDM symbols 101 form a slot 102, and 2 slots form a subframe 103. Each slot spans 0.5 ms, and each subframe spans 1.0 ms. A radio frame 104 is a time unit consisting of 10 subframes.

In the frequency domain, the smallest transmission unit is a subcarrier, and the total system transmission bandwidth consists of $N_{SC}^{BW}$ subcarriers 105. In the time-frequency resource structure, the basic resource unit is a resource element (RE) 106 indicated by an OFDM symbol index and a subcarrier index.

A resource block (RB) or physical resource block (PRB) 107 is defined by $N_{symb}$ consecutive OFDM symbols 101 in the time domain and $N_{SC}^{RB}$ consecutive subcarriers 108 in the frequency domain. That is, one RB 108 consists of $N_{symb} \times N_{SC}^{RB}$ REs 106. Typically, the RB is the smallest data transmission unit. In the LTE system, $N_{symb}=7$, $N_{SC}^{RB}=12$, and $N_{SC}^{BW}$ is proportional to the system transmission bandwidth.

In the LTE system, the DL or UL data scheduling information is transmitted from an eNB to a LTE using via DCI. The DCI may be categorized into different DCI formats depending on the purpose thereof, e.g., indicating UL grant for UL data scheduling or DL grant for DL data scheduling, indicating usage for control information that is small in size, indicating whether multiple antenna-based spatial multiplexing is applied, or indicating usage for power control. For example, the DCI format 1 for DL grant is configured to include at least the following information:

Resource allocation type 0/1 flag: Resource allocation type 0/1 flag indicates whether the resource allocation scheme is Type 0 or Type 1. A Type-0 is for allocating resources in units of a resource block group (RBG) by applying a bitmap scheme. In the LTE system, the basic unit of scheduling may be an RB that is expressed by time frequency domain resources, and the RBG may include multiple RBs and may be the basic unit of scheduling in the Type-0 scheme. A Type-1 is for allocating a particular RB in an RBG.

Resource block assignment: Resource block assignment indicates an RB allocated for data transmission. The resources may be determined depending on the system bandwidth and the resource allocation scheme.

Modulation and coding scheme (MCS): MCS indicates a modulation scheme used for data transmission and a size of a transport block to be, transmitted.

Hybrid automatic repeat request (HARQ) process number: A HARQ process number indicates a process number of HARQ.

New data indicator: A new data indicator indicates whether the HARQ transmission is an initial transmission or a retransmission.

Redundancy version (RV): A redundancy version indicates a redundancy version of HARQ.

Transmit power control (TPC) command for PUCCH: A TPC command for a PUCCH indicates a power control command for a PUCCH that is a UL control channel.

The DCI may be transmitted over a PDCCH or an EPDCCH after undergoing a channel coding and modulation process.

The DCI message payload is followed by a cyclic redundancy check (CRC) that is scrambled with a radio network temporary identifier (RNTI) used as a UE identity. The RNTI differs according to the purpose of the DCI message, e.g., UE-specific data transmission, power control command, and random access response. That is, the RNTI is not transmitted explicitly, but is implicitly encoded in the CRC.

Upon receipt of a DCI message on the PDCCH, the UE performs a CRC test with the assigned RNTI and recognizes, if the CRC test passes, that the corresponding message is transmitted to the UE. Herein, the expression "PDCCH or EPDCCH transmission/reception" may be interchangeably referred to as "DCI transmission/reception on a PDCCH or an EPDCCH". Such a technology may also be applied to other channels.

Figure 2:
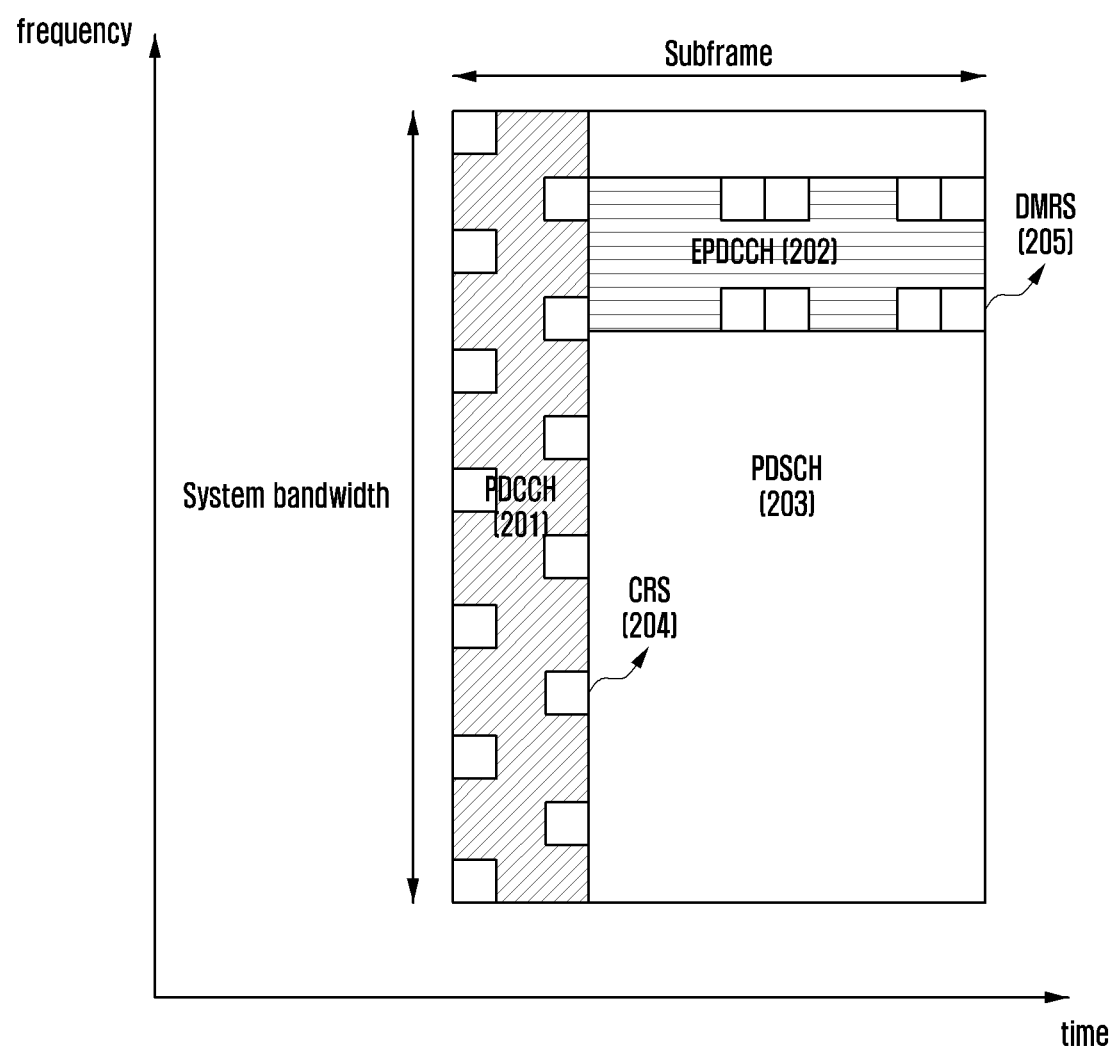
FIG. 2 illustrates a physical downlink control channel (PDCCH) and an enhanced PDCCH (EPDCCH) as DL physical channels carrying downlink control information (DCI) in an LTE system.

FIG. 2 illustrates a PDCCH and an EPDCCH as DL physical channels carrying a DCI in an LTE system.

Referring to FIG. 2, a PDCCH 201 is time-division-multiplexed. (TDMed) with a physical downlink shared channel (PDSCH) 203 as a data channel and spread across the whole system bandwidth. The control region for transmitting the PDCCH 201 can be expressed by a number of OFDM symbols, which is indicated by a control format indicator (CFI) being transmitted in physical control format indicator channel (PCFICH) to the UE. The PDCCH 201 is mapped to a few OFDM symbols at the beginning of the subframe, such that the UE promptly decodes the DL scheduling information for use in decoding a DL shared channel (DL-SCH) without delay, thereby reducing DL transmission delay.

Assuming that a PDCCH conveys one DCI message, multiple UEs PDCCHs may be transmitted per cell when multiple UEs are scheduled in a DL and an UL. As a reference signal (RS) for decoding the PDCCH 201, a cell-specific reference signal (CRS) 204 is used. The CRS 204 is spread across the whole system bandwidth and transmitted in every subframe with different scrambling and resource mapping determined according to the cell identifier (ID). The CRS 204 cannot be beamformed in a UE-specific manner because it is a common reference signal used by all of the UEs located within the cell. Accordingly, the multi-antenna transmission of LTE PDCCH is limited to open-loop transmit diversity. The number of CRS antenna ports (hereinafter, interchangeably referred to as "ports") is implicitly notified to the UE via physical broadcast channel (PBCH) decoding.

Resource allocation for the PDCCH 201 is performed based on a control-channel element (CCE). One CCE consists of 9 resource element groups (REGs), i.e., 36 resource elements (REs). The PDCCH 201 may be transmitted on 1, 2, 4, or 8 CCEs, and the number of CCEs is determined depending on the channel coding rate of the DCI message payload. Different numbers of CCEs are used to achieve link adaptation of the PDCCH 201.

A UE detects the PDCCH 201 without information thereon through blind decoding. In LTE, blind decoding is performed within a search space determining a set of CCEs. The search space is a group of CCEs indicated by an aggregation level (AL), which is implicitly determined based on a function of the UE identity and a subframe number, rather than explicitly signaled. The UE performs blind decoding on all possible resource candidates available with the CCEs within the search space in order to decode the PDCCH 201 and processes the information verified as valid for the UE through a CRC test.

There are two types of search space: 1) a UE-specific search space, and 2) a common search space. A group of UEs or all UEs may monitor the common search space of the PDCCH 201 in order to receive cell-specific control information, such as dynamic scheduling for system information and a paging message. For example, the UE may receive DL-SCH scheduling assignment information for transmitting a system information block-1 (SIB-1) including operator information of the cell by decoding the common search space of the PDCCH 201.

As illustrated in FIG. 2, are EPDCCH 202 is multiplexed with a PDSCH 203 in frequency. The eNB may allocate resources for the EPDCCH 202 and the PDSCH 203 appropriately through scheduling in order to effectively support coexistence of the EPDCCH 202 with the data transmission to a legacy LTE UE. However, a problem arises in that the EPDCCH 202 spanning one subframe contributes to transmission delay. Multiple EPDCCHs 202 may constitute an EPDCCH set for which resources are allocated by a PRB pair. The EPDCCH set location is configured in a UE-specific manner, and the EPDCCH set location information is transmitted via radio resource control (RRC) signaling. A UE may be assigned up to two EPDCCH sets, and one of the EPDCCH sets may be multiplexed with those of other UEs.

The resource allocation for the EPDCCH 202 is performed based on enhanced CCE (ECCE). One ECCE consists of 4 or 8 enhanced REGs (EREGs), and the number of EREGs per ECCE is determined depending on the cyclic prefix (CP) length and subframe configuration information. As one EREG consists of 9 REs, there may be up to 16 EREGs per PRB pair.

There are two different ways of transmitting the EPDCCHs according to the mapping scheme of EREGs to REs: localized or distributed. There are 6 possible ECCE aggregation levels (1, 2, 4, 8, 16, and 32) of which one is selected based on the CP length, subframe configuration, EPDCCH format, and transmission scheme.

The EPDCCH 202 is transmitted only in the UE-specific search space. Accordingly, the UE monitors the common search spaces for the PDCCH 201 to receive the system information.

The EPDCCH 202 carries a demodulation reference signal (DMRS) 205. The eNB may perform precoding on the EPDCCH 202 and use UE-specific beamforming. Without notice of the precoding in use for EPDCCH 202, the UEs may decode the EPDCCH 202. The EPDCCH 202 is configured with the same DMRS pattern as in use for PDSCH 203, However, the DMRS 205 may support up to 4 antenna ports in the EPDCCH 202, unlike in the PDSCH 203. The DMRS 205 may be transmitted only in a PRB to which the EPDCCH is mapped.

The port configuration information of the DMRS 205 differs depending on the EPDCCH transmission mode. In the localized transmission mode, the antenna ports corresponding to the ECCEs to which the EPDCCH 202 are mapped are selected based on the UE ID. When the same ECCEs are shared by multiple SEs, i.e., multiuser MIMO is used for transmission, the DMRS antenna ports may be assigned for the respective UEs. The DMRS 205 may also be transmitted in a shared manner and, in this case, the DMRS may be identified by a DMRS scrambling sequence configured via high layer signaling. In the distributed transmission mode, it is possible to support up to two antenna ports for the DMRS 205 and a precoder cycling-based diversity scheme. The DMRS 205 mapped to the REs within the same PRB pair may be shared.

Figure 3:
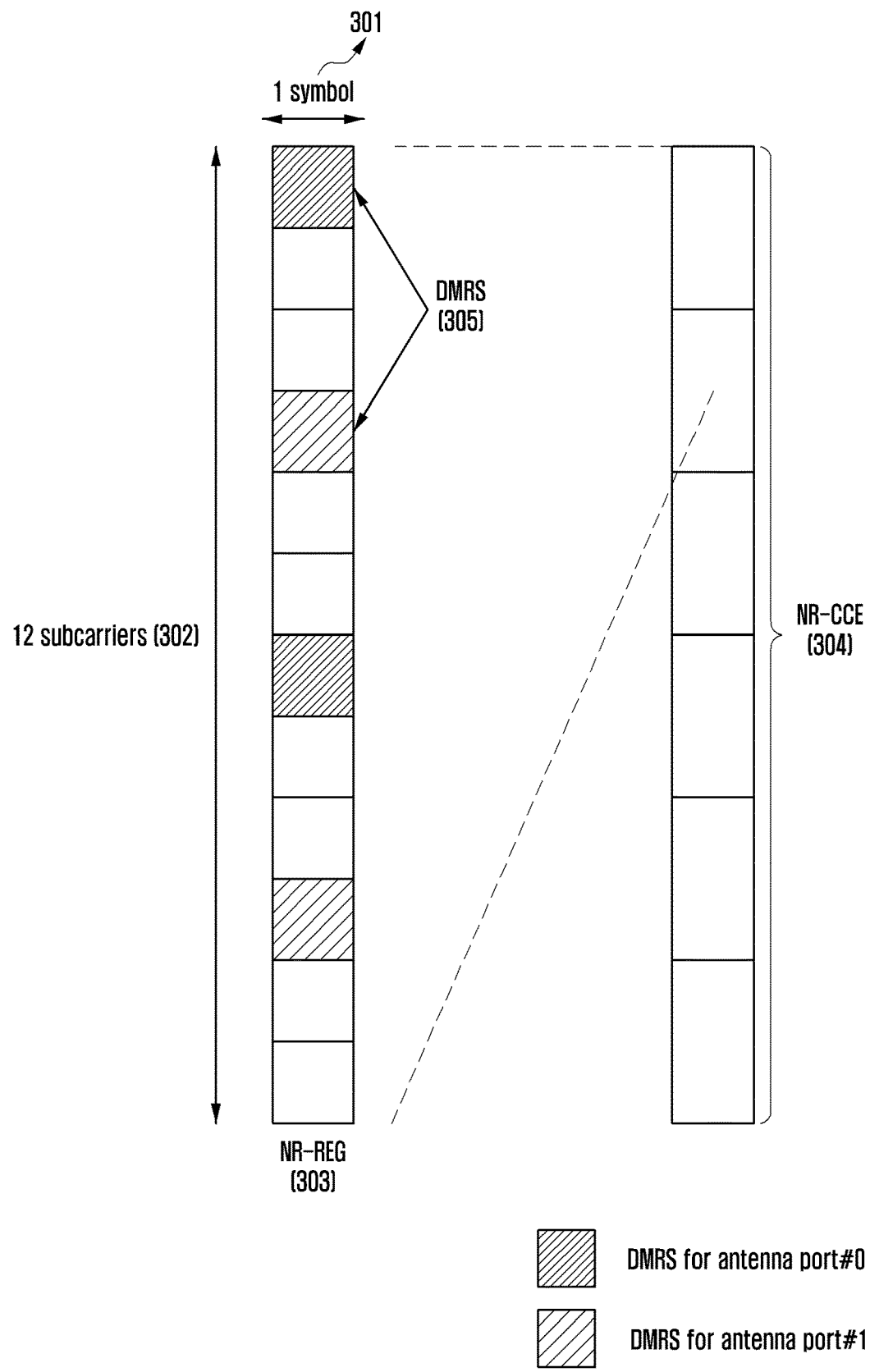
FIG. 3 illustrates a DL control channel.

FIG. 3 illustrates a DL control channel. Specifically, FIG. 3 illustrates a basic unit of time and frequency resources for a DL control channel in a 5G system.

Referring to FIG. 3, a basic unit of time and frequency resources for a control channel may be referred to as resource element group (REG) or new radio REG (NR-REG). The NR-REG 303 is made up of one OFDM symbol 301 in domain and 12 subcarriers 302, i.e., one RB, in the frequency domain. By assuming one OFDM symbol as a basic unit of control channel resources in the time domain, it may be possible to multiplex data and control channels in one subframe.

The control channel is followed by the data channel to reduce the processing time at a UE, in order to meet the latency requirement. By using it RB 302 as the basic unit of control channel resources in the frequency domain, it may be possible to facilitate multiplexing the control and data channels in frequency.

By concatenating multiple the NR-REGs 303, various control channel regions may be configured with different sizes. For example, assuming that the basic unit of DL control channel resource allocation is an NR-CCE 304 in 5G, the NR-CCE 304 may be made up of a plurality of NR-REGs 303. For example, the NR-REG 303 is made up of 12 REs and, assuming that one NR-CCE 304 consists of 4 NR-REGs 303, the CCE 304 consists of 48 REs. If the DL control region is configured, the control region may consist of multiple NR-CCEs 304, and a certain DL control channel may be mapped to one or more NR-CCEs 304 according to the AL in the control region. The NR-CCEs 304 constituting the control region are distinguished by CCE numbers, which are assigned in a way of logical mapping.

The basic unit of DL control channel resources, i.e NR-REGs 303, illustrated in FIG. 3 may include REs to which a DCI is mapped and REs to which the DMRS 305, as a reference signal for use in decoding the DCI, is mapped. The DMRS 305 may be efficiently transmitted in consideration of the overhead caused by RS allocation. For example, when the DL control channel is transmitted using a plurality OFDM symbols, the DMRS 305 may be transmitted only at the first OFDM symbol. The DMRS 405 may be mapped in consideration of the number of antenna ports in use for transmitting the DL control channel. For example, FIG. 3 illustrates two antenna ports in use, such that the DMRS 306 and DMRS 307 may be transmitted for antenna port #0 and antenna port #1 respectively.

The DMRSs for different antenna ports may be multiplexed in various manners. FIG. 3 illustrates the DMRSs for different antenna ports being mapped to different REs for maintaining orthogonality. The DMRSs may be frequency-division-multiplexed (FDMed) as illustrated in FIG. 3, or code-division multiplexed (CDMed).

The DMRS may be configured in various DMRS patterns in association with the number of antenna, ports.

Figure 4:
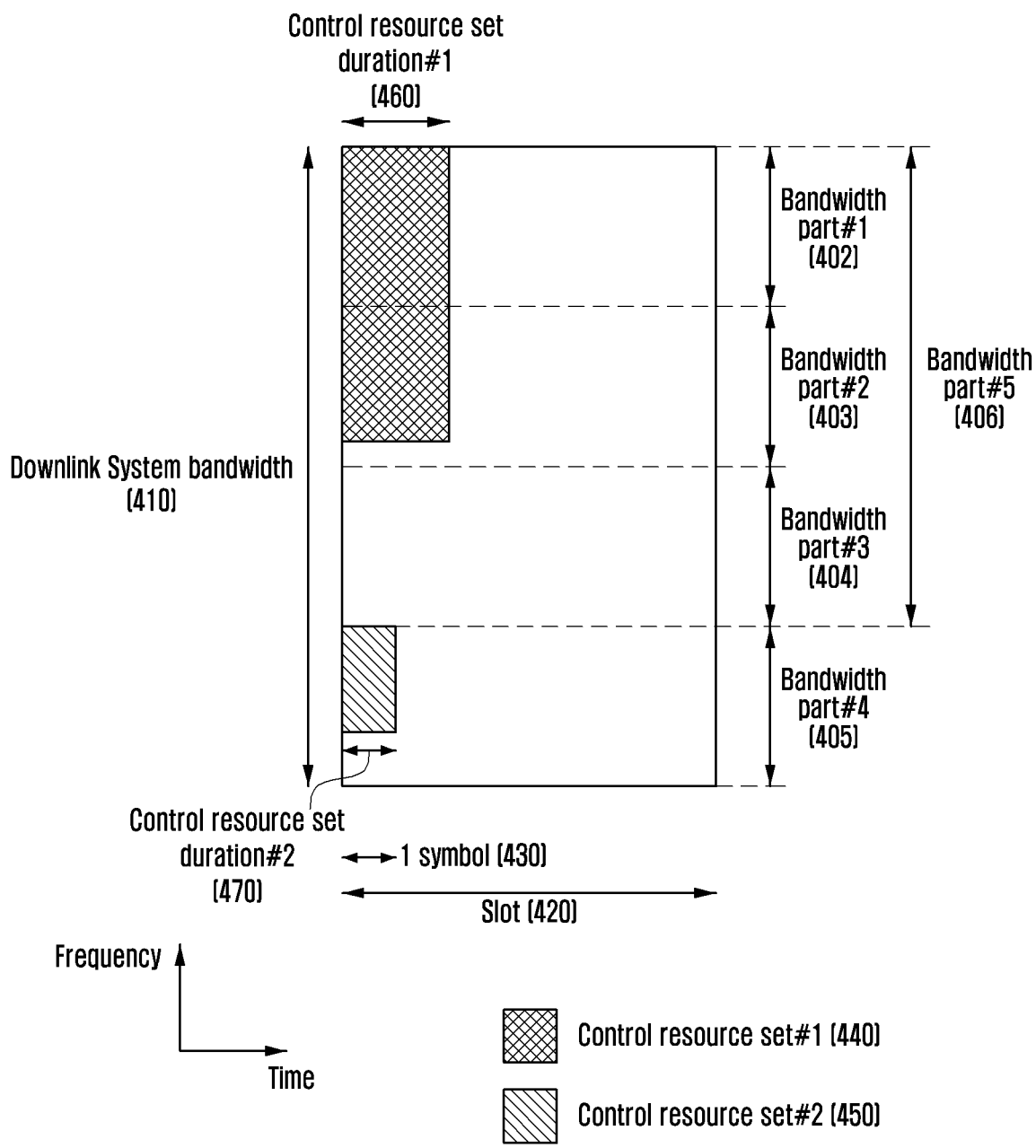
FIG. 4 illustrates a control resource set (CORESET) for transmitting DL control channels in a 5G wireless communication system according to an embodiment.

In FIG. 4, the CORESET length 460 of the CORESET #1 440 is 2 symbols, and the CORESET length #2 470 of the CORESET #2 450 is 1 symbol.

In a 5G system, multiple CORESETs may be configured in view of a BS or in view of a terminal. It may also be possible to assign a part of the CORESETs con figured in the system. Accordingly, a UE may not know all of the CORESETs configured in the system. Assuming that two CORESETs, i.e., CORESET #1 440 and CORESET #2 450, can be configured in the system as illustrated in FIG. 4, it may be possible to configure CORESET #1 440 for UE #1 and CORESET #1 440 and CORESET #2 450 for UE #2.

In the 5G system, a CORESET may be configured as one of a common CORESET, a UE-group common CORESET, or a UE-specific CORESET. A CORESET may be configured per UE via UE-specific signaling, UE-group common signaling, or RRC signaling. If a CORESET is configured to a UE, the information on the CORESET location, CORESET sub-bands, CORESET resource allocation, and CORESET length is provided to the UE. The CORESET configuration information provided to the UE may include the information in Table 1 below.

TABLE 1

Configuration information 1. RB allocation in frequency domain
Configuration information 2. CORESET length in time domain (a number of OFDM symbols configured for CORESET)
Configuration information 3. Resource mapping scheme (time-preference mapping, frequency-preference mapping)
Configuration information 4. Resource mapping scheme (localized transmission scheme, or distributed transmission scheme)
Configuration information 5. Search space type (common search space, UE-group search space, or UE-specific search space)
Configuration information 6. Monitoring occasion (monitoring period/interval, or monitoring symbol location in a slot)
Configuration information 7. DMRS configuration information (DMRS structure, or number of DMRS ports)
Configuration information 8, REG bundling size In the following description of the present disclosure, although it is assumed that two antenna ports are used, the present disclosure may be applied to more than two antenna ports.

FIG. 4 illustrates a CORESET for transmitting DL control channels in a 5G wireless communication system according to an embodiment.

Referring to FIG. 4, a resource grid spans a system bandwidth 410 in the frequency domain and 1 slot 420 in the time domain. Although FIG. 4 illustrates a slot of 7 OFDM symbols, the same principle is applicable to a slot consisting of 14 OFDM symbols.

The whole system bandwidth 410 is divided into one or more bandwidth parts (BWPs), i.e., BWP #1 402, BWP #2 403, BWP #3 404, and BWP #4 405. It may also be possible to configure a BWP corresponding to multiple BWPs like BWP #5 406.

In FIG. 4, two CORESETs (i.e., CORESET #1 440 and CORESET #2 450) are configured. The CORESETs 440 and 450 may be configured to occupy specific sub-bands across the whole system bandwidth 410.

In FIG. 4, the CORESET #1 440 is configured across two BWPs, i.e., BWP #1 402 and BWP #2 403, while the CORESET #2 450 is configured with one BWP, i.e., BWP #4 405. A CORESET may span one or more OFDM symbols in the time domain and its length (or control resource set duration) is specified by a number of OFDM symbols as denoted by reference numbers 460 and 470.

The CORESET configuration information may further include other information for transmitting the DL control channel in addition to the aforementioned information.

Figure 5:
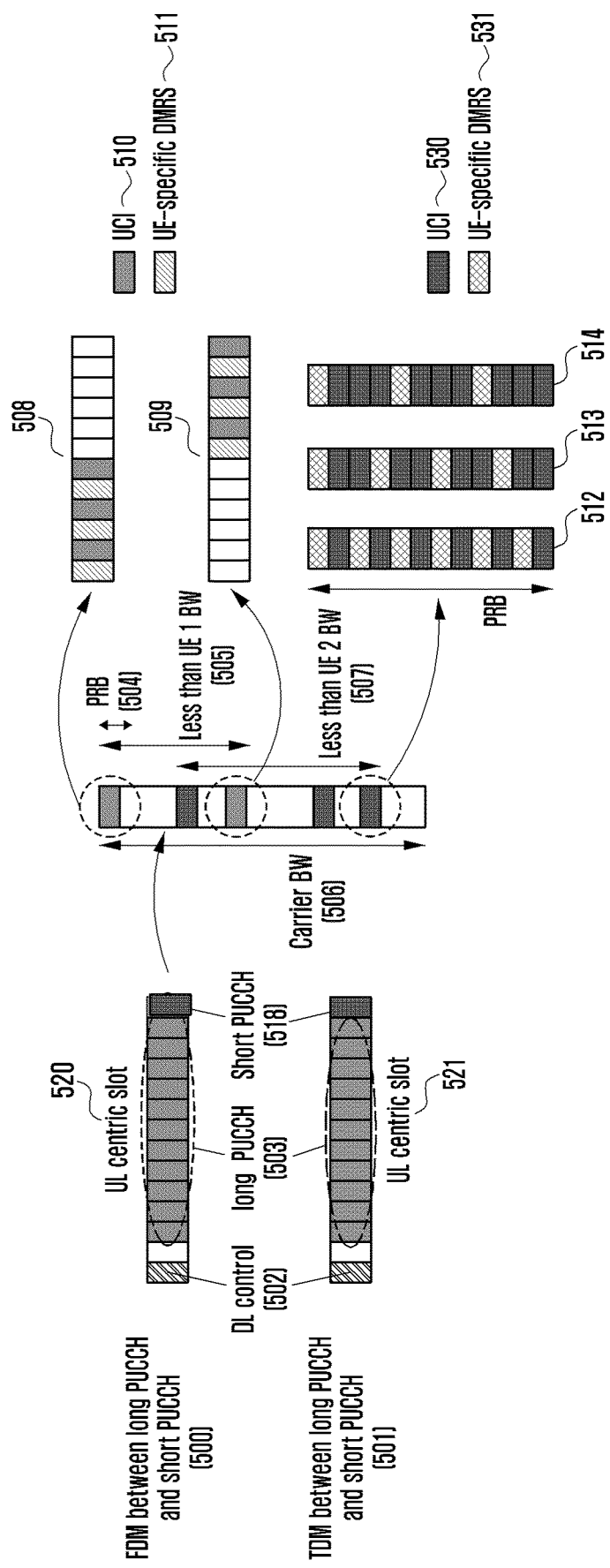
FIG. 5 illustrates a physical uplink control channel (PUCCH) format for use in a 5G wireless communication system according to an embodiment.

FIG. 5 illustrates a PUCCH format for use in a 5G wireless communication system according to an embodiment.

Although FIG. 5 is directed to a scenario in which the UE determines the transmission period (or start and end symbol locations or start symbol location and number of symbols for transmission) of a long PUCCH for transmitting PUCCHs on the basis of a slot, the UE may also determine the transmission period of a long PUCCH for transmitting PUCCHs on the basis of a mini-slot (e.g., composed of less symbols than one slot).

Herein, a PUCCH having a short transmission period (e.g., one or two symbols) for minimizing transmission delay is referred to as "a short PUCCH," and a PUCCH having a long transmission period (e.g., or more symbols) for securing sufficient cell coverage is referred to as "a long PUCCH."

Although FIG. 5 is described with a slot as the basic unit of signal transmission, it may also be possible to use a different unit, such as a subframe or a TTI.

Referring to FIG. 5, a long PUCCH and a short PUCCH are FDMed as denoted by reference number 500 and TDMed as denoted by reference number 501.

Reference numbers 520 and 521 denote slots, each composed mainly of UL symbols, i.e., a UL-centric slot. The UL-centric slot is mainly composed of UL OFDM symbols and, in one UL-centric slot, it may be possible that the OFDM symbols constituting the slot are all the UL OFDM symbols or mainly UL OFDM symbols and a few DL OFDM symbols located at the beginning or end of the slot with a guard interval (or gap) between the DL and UL OFDM symbols.

In FIG. 5, the UL-centric slot includes one DL OFDM symbol, i.e., the first OFDM symbol, as denoted by reference number 502, and a plurality of UL OFDM symbols, i.e., the third to last OFDM symbols. The second OFDM symbol is used as a guard interval. During a period corresponding to the UL OFDM symbols, it may be possible to perform UL data channel transmission and UL control channel transmission.

A long control channel may be transmitted in a discrete Fourier transform spread OFDM (DFT-S-OFDM) scheme as a single carrier transmission scheme, rather than the OFDM transmission scheme, because the long control channel is used to expand the cell coverage. Accordingly; the control channel should be transmitted on contiguous subcarriers and, in order to achieve a frequency diversity effect, the long PUCCHs should be arranged at discrete locations as denoted by reference numbers 508 and 509. The frequency distance 505 should be less than or equal to the UL bandwidth supported by or configured to the UE.

The UE performs long PUCCH transmission in PRB-1 at the beginning of the slot as denoted by reference number 508 and in PRB-2 at the end of the slot as denoted by reference number 509. The PRB is the smallest unit of transmission in the frequency domain and consists of 12 subcarriers. Accordingly, the distance between PRB-1 and PRB-2 should be less than or equal to the maximum supportable bandwidth of the UE or the UL transmission bandwidth configured to the UE, and the maximum supportable bandwidth of the UE may be less than or equal to the bandwidth 506 supported by the system.

The frequency resources PRB-1 and PRB-2 may be configured to the UE by mapping the frequency resources to corresponding bit fields via higher signaling (or higher layer signal). More specifically, the UE may be notified of the frequency resources to be used using a bit field included in a DL control channel. Both the control channel being transmitted at the beginning of the slot, as denoted by reference number 508, and the control channel being transmitted at the end of the slot, as denoted by reference number 509, include UL control information (UCI) 510 and a UE-specific reference signal 511. Herein, it is assumed that the two signals are visually distinguished from each other and transmitted at different OFDM symbols.

The short PUCCH 518 may be transmitted in any DL-centric and UL-centric slot; particularly; at the last symbol or OFDM symbols at the end of the slot (e.g., a last OFDM symbol, a next to last OFDM symbol, or the last two OFDM symbols). The short PUCCH 518 may also be transmitted at an arbitrary location in the slot. The short PUCCH 518 may be mapped to one or multiple OFDM symbols.

In FIG. 5, the short PUCCH 518 is mapped to the last symbol of each of the slots 520 and 521 by way of example.

The radio resources for the short PUCCH 518 are allocated by a PRB by mapping the PUCCH to multiple consecutive or discrete PRBs in the frequency domain. The allocated PRBs should be included in a band that is narrower than or equal to the frequency band 507 supported by the UE or the UL transmission bandwidth that the BS has configured to the UE. The multiple PRBs as allocated frequency resources that may be configured to the UE via higher layer signaling by mapping the frequency resources to corresponding bit fields and notifying the UE of the frequency resources to be used via a bit field included in the DL control channel.

The UCI 530 and DMRS 531 are frequency-multiplexed in a PRB to transmit the DMRS 531 on one subcarrier per two subcarriers, as denoted by reference number 512, per three subcarriers, as denoted by reference number 513, or per four subcarriers, as denoted by reference number 514. One of the DMRS transmission schemes denoted by reference numbers 512, 513, and 514 may be configured via higher layer signaling. The UE may transmit the DMRS 531 and UCI 530 multiplexed as indicated via higher layer signaling.

The DMRS transmission scheme may also be determined based on the number of bits of the UCI 530. If the number of bits of the UCI 530 is small, the UE may multiplex the DMRS 531 and UCI 530 into a control channel to transmit the DMRS 531 and UCI 530, as denoted by reference number 512. When the number of bits of the UCI 530 is small, it is possible to achieve a sufficient transmission coding rate with less resources for UCI transmission. If the number of bits of the UCI 530 is large, the UE may multiplex the DMRS 531 and the UCI 530 into a control channel to transmit the DMRS 531 and UCI 530, as denoted by reference number 514. When the number of bits of the UCI 530 is large, a large amount of the resources are used for UCI transmission at a reduced transmission coding rate.

The UE may determine whether to use the long PUCCH or short PUCCH in a slot or a mini-slot for transmitting the UCI based on the information indicating the use of the long or short PUCCH, which is received from the BS via higher layer signaling. The UE may also determine whether to use the long PUCCH or short PUCCH in a slot or a mini-slot for transmitting the UCI based on the information indicating the use of the long or short PUCCH, which is received from the BS via physical layer signaling.

The UE may also determine whether to use the long PUCCH or short PUCCH in a slot or a mini-slot for transmitting the UCI based on the information obtained implicitly from the number of UL symbols of the slot or mini-slot.

For example, the UE may transmit the UCI using the short PUCCH when the number of UL symbols included in the slot or mini-slot, notified or configured by the BS, for UCI transmission is 1 or 2 and using the long PUCCH when the number of UL symbols included in the slot or mini-slot is 4 to 14.

The UE may also determine whether to use the long PUCCH or short PUCCH in a slot or a mini-slot for transmitting the UCI based on the information indicating the waveform of a msg3, which is included in a msg2, which is transmitted in the random access procedure. That is, if the information indicating the waveform of the msg3, which is included in the msg2, is set to cyclic prefix OFDM (CP-OFDM), the UE transmits the UCI with the short PUCCH using the CP-OFDM waveform. If the information indicating the waveform of the msg3, which is included in the msg2, is set to DFT-S-OFDM, the UE transmits the UCI with the long PUCCH using the DFT-S-OFDM waveform.

The long and short PUCCHs for different UEs may be frequency multiplexed into one slat 520, as denoted by reference number 500. In this case, the BS may configure the short and long PUCCH frequency resources without being overlapped in one PRB. However, configuring different PUCCH transmission resources for all individual UEs causes frequency resource waste and is inappropriate considering that the frequency resources are constrained and should be largely allocated for UL data channel transmission rather than UL control channel transmission.

Accordingly, the short and long PUCCHs resources allocated for different UEs may be overlapped, and the BS controls the scheduled resources and UE-specific transmission resources to not collide in one slot. However, when it is impossible to avoid collision between the short and long PUCCH transmission resources, a method is needed for the BS to configure the long and short transmission resources so that they do not collide and for the UE to adjust the long PUCCH transmission resources according to an instruction from the BS. According to a method of the present disclosure, the short and long PUCCH transmission resources may be time-multiplexed in one slot 521, as denoted by reference number 501.

Here, at least one of an UL scheduling configuration (UL scheduling grant) signal and a DL data signal is referred to as "a first signal," and at least one of an UL data signal corresponding to the UL scheduling configuration signal and a response signal (or HARQ ACK/NACK signal) corresponding to the DL data signal is referred to as "a second signal." For example, a signal transmitted with an expectation of a reply among the signals from the BS to the UE may be the first signal, and a response signal transmitted by the UE, as the reply to the first signal, may be the second signal. A service type of data conveyed in the first signal may be eMBB, URLLC, and/or mMTC, and the second signal may correspond to the service type of the data conveyed in the first signal.

The present disclosure is applicable to a new type of duplex mode (e.g., a frame structure type 3) as well as a frequency division duplex (FDD) mode and time division duplex (TDD) mode.

Herein, the term "higher signaling (or higher layer signaling)" includes a signal transmission from a BS to a UE using a physical DL data channel or from the UE to the BS using a physical UL data channel, and it may also include a signal exchange between the BS and the UE via at least one of RRC signaling, packet data convergence protocol (PDCP) signaling, and MAC control element (MAC CE).

In accordance with an embodiment of the present disclosure, an UL transmission resource allocation method is provided for transmitting UL transmission configuration information to a UE in order to provide the UE with at least one of eMBB, mMTC, and URLLC service types and reducing delay of configured UL transmissions. Although descriptions are made of UL transmissions between a BS and a UE in a licensed band and an unlicensed band, separately, the methods in accordance with the embodiments of the present disclosure can be applied with no distinction between the licensed and unlicensed bands.

Typically, a BS schedules a certain TTI and a frequency resource region to a UE for UL data or control information transmission associated with eMBB, mMTC, and URLLC services. For example, the BS may make a configuration at subframe n for the UE to perform UL transmission at subframe n+k (k≥0). That is, the BS may transmit, at subframe n, UL transmission configuration information to the UE that desires UL transmission and, upon receipt of the UL transmission configuration information, the UE may transmit UL data or control information to the BS (or another UE) using the time and frequency resource region indicated in the UL transmission configuration information. Here, the LTE that has the UL data or control information to be transmitted may request to the BS for the UL transmission configuration information by transmitting scheduling request information or through a random access procedure.

For example, the UL transmission of a normal UE may be performed through 3 steps as follows.

Step 1: If UL data or control information to be transmitted is generated at the UE, the UE requests the BS for UL transmission configuration using resources that are valid for transmitting UL transmission configuration (or resource) request (scheduling request). Here, at least one of time and frequency resources for use in the UL transmission configuration request may be predefined or preconfigured via higher layer signaling.

Step 2: If the BS receives the UL transmission configuration request from the UE, the BS makes a configuration for the UL transmission by transmitting UL transmission configuration information to the UE through a DL control channel.

Step 3: Upon receipt of the UL transmission configuration information from the BS, the UE performs UL transmission based on the UL transmission configuration information received from the BS.

However, a delay occurs for the UE for transmitting the UL data or control information over a predetermined time period. For example, if the UE at which the UL data is generated at time n is configured with an UL transmission configuration resource interval of 5 ms, the UE may experience a delay of up to 5 ms for transmitting the UL transmission configuration request information.

Further, if there is a need of a time lag (e.g., 1 ms) between receiving the control information carrying UL transmission configuration and starting the configured UL transmission, the UE may experience the transmission delay of at least 6 ms for starting the UL transmission.

In a normal LTE system, the time lag between receiving the UL transmission configuration control information and starting the configured UL transmission is at least 4 ms. In accordance with an embodiment of the present disclosure, a method is provided for reducing the UL transmission delay such that the UE performs the UL signal transmission operation without receiving separate UL transmission configuration information.

Throughout all embodiments of the present disclosure, a scheme for a UE to receive UL transmission configuration information, UL scheduling configuration information, or UL grant from a BS through a DL control channel (e.g., PDCCH) and transmit UL information to the BS through a UL data channel PUSCH) based on the received UL transmission configuration information is referred to as "a first UL transmission scheme" or "a grant-based UL transmission scheme."

A scheme for a UE to transmit UL information according to UL transmission configuration information preconfigured by the UE or to select at least one of preconfigured UL transmission configuration information and transmit the UL information based on the preconfigured Ut, transmission configuration information and the selected UL transmission configuration information, without receiving UL transmission configuration information, UL scheduling configuration information, or UL grant from the BS through a DL control channel (e.g., PDCCH), like a semi-persistent scheduling (SPS) scheme, is referred to as "a second UL transmission scheme," "a grant-free UL transmission scheme," or "a non-scheduling UL transmission scheme."

Here, the UE may transmit a UL signal based on only the UL transmission configuration information configured via higher layer signaling in the second UL transmission scheme or based on the UL transmission configuration information preconfigured via higher layer signaling and UL transmission configuration information included in the DL control information (e.g., DCI scrambled with an SPS C-RNTI) indicating initiation of the second UL transmission. That is, the second UL transmission is a UL transmission performed without receiving DCI in a DCI format conveying the UL transmission configuration information via a PDCCH from the BS. In the second UL transmission scheme, the UL transmission configuration information for use in starting the UL transmission may be obtained from the UL transmission configuration information, UL scheduling configuration information, or UL grant transmitted by the BS through a DL control channel (e.g., a PDCCH).

In accordance with an embodiment of the present disclosure, a method is provided for a UE to perform UL transmission using radio resources such as second UL transmission time, a frequency, and a code predefined by the BS or configured through a broadcast channel including higher layer signaling and system information (e.g., a system information block (SIB)) in the second UL transmission scheme, without receiving separate UL transmission configuration information from a BS through a DL control channel. A method is also provided for switching the UL transmission scheme from the second UL transmission scheme to the first lit transmission scheme.

Typically, a UE performs UL signal transmission by receiving UL transmission configuration information or scheduling information from a BS and then transmitting the UL signal using the time and frequency resources configured based on the UL transmission configuration information received from the BS.

The BS may make a configuration for the UE, via higher layer signaling, to use an UL transmission scheme, e.g., one of the first and second UL transmission schemes, or the second UL transmission scheme in addition to the first UL transmission scheme with the BS or in a cell. The BS may configure the UL transmission scheme of the UE via higher layer signaling as follows. The BS may include a field indicating the UL transmission scheme of the UE, e.g., grantfreeULtransmission field, in the RRC configuration information for a specific BS or cell (or SCell or transmission and reception point (TRP)).

The BS may set the field value to 'true' or enable the field for making it possible for the UE to configure the second UL transmission scheme as the UL transmission scheme for the corresponding cell or use the second UL transmission scheme in addition to the first UL transmission scheme. Here, if the UE receives the RRC field value set to 'false' or ascertains that there is no grantfreeULtransmission field, it may determine that only the first UL transmission scheme is available as the UL transmission scheme in the corresponding cell. Although the RRC field, configuration method (e.g., true/false), and UL transmission scheme assortment are specified by way of example, the present disclosure is not limited thereto.

The BS may transmit the information on the UL transmission scheme for use in association with the BS or the cell to one or more UEs via system information through a BS-specific or cell-specific broadcast channel. The BS may notify the UE of the UL transmission scheme via the system information broadcast on the broadcast channel as follows. The BS or the cell (SCell or TRP) may periodically or aperiodically broadcast the cell-specific system information (e.g., master information block (MIB) and SIB) to one or more UEs. Here, the broadcast channel indicates a channel that a plurality of UEs can receive with a predefined identifier (e.g., system information RNTI).

The system information may include second UL transmission scheme configuration information as well as cell-specific UL transmission scheme configuration information. For example, the system information may further include information on at least one of UL signal transmission time and frequency resources in accordance with the second UL transmission scheme. If the UL transmission scheme for the cell is set to the first UL transmission scheme, the information on the time and frequency resources for UL signal transmission in the second UL transmission scheme may be omitted from the system information or, if included, may be ignored by the UE.

The BS may configure the UL transmission scheme of the UE through a DL control channel. The BS may configure the UL transmission scheme of the UE through a DL channel by transmitting, among its DL control channels, a common control channel (or cell-specific search space) or group common control channel (or group-specific search space) having an indicator or a field indicating a UL transmission scheme. The UE may determine the UL transmission scheme or whether the second UL transmission scheme can be used for UL transmission based on the corresponding field. If the common control channel or the group common control channel is used, all or a specific group of UEs receive the same control information from the BS using an identifier (e.g., a group RNTI) predefined for specific UEs or configured by the BS.

For example, the BS may add a field indicating the UL transmission scheme of the group to the UL transmission-related information being transmitted through the group common control channel to configure the UL transmission scheme of the UEs belonging to the corresponding group or allow for UL transmission in the second UL transmission scheme. For example, the BS may add a UL transmission scheme, a UL transmission type field, or a field conveying information indicating whether a UL transmission configuration is present/absent, e.g., 1-bit field. If the field is set to 1, the UEs that have received the control channel may perform UL transmission to the BS or cell in the second UL transmission scheme. If the field is set to 0, the UEs that have received the control channel may perform UL transmission to the BS or cell in the first UL transmission scheme.

Although the field is added and configured in a specific manner by way of example above, the field may be configured to have a length longer than 1 bit. For example, the BS may add a 2-bit field to the UL transmission-related information to configure one or both of the first and second UL transmission schemes to the UEs.

When the UE is configured with the second UL transmission scheme as its UL transmission scheme, the UE may receive all UL transmission-related variables from the BS via higher layer signaling or may receive part of the UL transmission-related variables from the BS via higher layer signaling and make a selection on no-received UL transmission configuration information to transmit the UL signal in the second UL transmission scheme according to the selected configuration. The UE may receive part of the UL transmission-related variables from the BS via higher layer signaling. For the other UL transmission-related variables, the UE may receive the candidates from the BS via higher layer signaling, select one of the candidates, and transmit the UL signal in the second UL transmission scheme determined based on the selected configuration. For example, the UE may select at least one of a time resource region, a frequency resource region, an MCS, a pre-coding matrix (PMI), a DIN/IRS sequence, and a DMRS cyclic shift) for use in transmitting the UL signal based on the selection variable.

For example, after configuring the second UL transmission scheme to the UE, the BS may configure periodic time resource region information available for UL transmission in the second UL transmission scheme via a higher layer signal or a combination of a higher layer signal and UL transmission configuration information. The UE may select a time-frequency resource region to perform the real UL transmission among the time-frequency regions available for UL transmission according to the configured second UL transmission scheme. As another example, the BS may configure candidates or set values, e.g., an MCS set (quadrature phase shift keying (QPSK) and 16QAM), of UL transmission-related variables that are selectable by the UE, such that the UE selects the UL transmission configuration values for use in the second UL transmission scheme. Although the descriptions herein are directed to the time-frequency resource region being preconfigured and the UE selecting the time-frequency resources and/or the MCS value arbitrary or based on the channel status information, the UE may also select all or part of the variables including other variables in addition to the aforementioned variables related to the UL transmission in order to transmit the UL signal according to the second UL transmission scheme.

The BS may receive a UL signal and detect a predetermined signal (e.g., a DMRS sequence, DMRS cyclic shift information, and a preamble for configured for use by the UE) in the received signal to determine whether the signal is transmitted by the UE. If the BS determines that the UL signal is transmitted by the UE, the BS performs decoding on the received LTL signal and makes a UL signal reception result determination. That is, the BS may make one of three UL signal reception result determinations: 1) detecting the UL signal transmission from the UE and decoding the UL signal correctly (successful reception), 2) detecting the UL signal from the UE but failing correct decoding on the UL signal (reception failure), and 3) failing detection of the UL signal from the UE (detection failure).

When the BS detects the UL signal transmitted by the UE but fails to decode correctly, the BS may request the UE for UL retransmission, That is, the BS notifies the UE of its UL signal reception result.

When the BS detects the UL signal transmitted by the UE and decodes the LTL signal successfully, it may avoid separately notifying the UE of the UL signal reception result.

When not transmitting UL signal reception results and the BS receives the UL signal from the UE successfully, if a predetermined time period or timer expires or if the UE is configured for a new UL transmission in the first UL transmission scheme, the UE may assume that the BS has received the UL signal successfully based on the above information. Here, the BS may notify the UE of the UL signal reception result even when it detects the UL signal transmitted by the LTE and decodes the LTL signal successfully.

However, when the BS fails to detect the UL signal transmitted by the UE, i.e., the BS determines that there is no UL signal transmitted by the UE, the BS cannot notify the UE of the UL signal reception result. Accordingly, the BS notifies the UE of the UL signal reception result and requests the UE for retransmission of the UL signal at least when detecting the UL signal transmitted by the UE but failing to decode the UL signal (reception failure) among the cases 1) and 2) above, i.e., detecting the UL signal transmitted by the UE and decoding the UL signal successfully (successful reception), and detecting the UL signal transmitted by the UE but failing to decode the UL signal (reception failure).

Accordingly, the BS transmits, to the UE, the UL retransmission-related configuration information, UL scheduling configuration information, or UL grant through a DL control channel according to the second UL transmission scheme. Upon receiving the UL scheduling configuration information, the UE may retransmit the UL signal based on the UL transmission configuration information. That is, the LTE may retransmit the UL signal according to the second UL transmission scheme in the first UL transmission scheme.

Conventionally, a UE cannot determine whether UL scheduling configuration information received from the BS is UL transmission configuration information configured for retransmission of a UL signal transmitted in the second UL transmission scheme or UL transmission configuration information configured for transmitting a new UL signal in the first UL transmission scheme. Therefore, in accordance with an embodiment of the present disclosure, a method is provided for determining whether the UL scheduling configuration information received from the BS is the UL transmission configuration information configured for retransmission of the UL signal transmitted in the second UL transmission scheme or the UL transmission configuration information configured for transmitting a new UL signal in the first UL transmission scheme, and a second UL transmission resource configuration method.

Although descriptions are made herein with a slot as a unit, a HARQ process ID determination may be made in a unit of time or a slot of the present disclosure using a unit of a mini-slot having symbols smaller in number than those of a slot or a subframe having symbols larger in number than those of a slot.

In accordance with an embodiment of the present disclosure, a UE may determine second UL transmission resources and whether UL scheduling configuration information received from a BS is UL transmission configuration information configured for retransmission of a UL signal transmitted in the second UL transmission scheme or transmission configuration information configured for a new UL signal in the first UL transmission scheme.

The UE may receive period information (P) of the second UL transmission resources and an offset value from the BS via higher layer signaling. The period and offset value may be given as a unit of absolute time (e.g., in ms), a slot, or a symbol; typically, the offset value is less than or equal to the period.

Figure 6A:
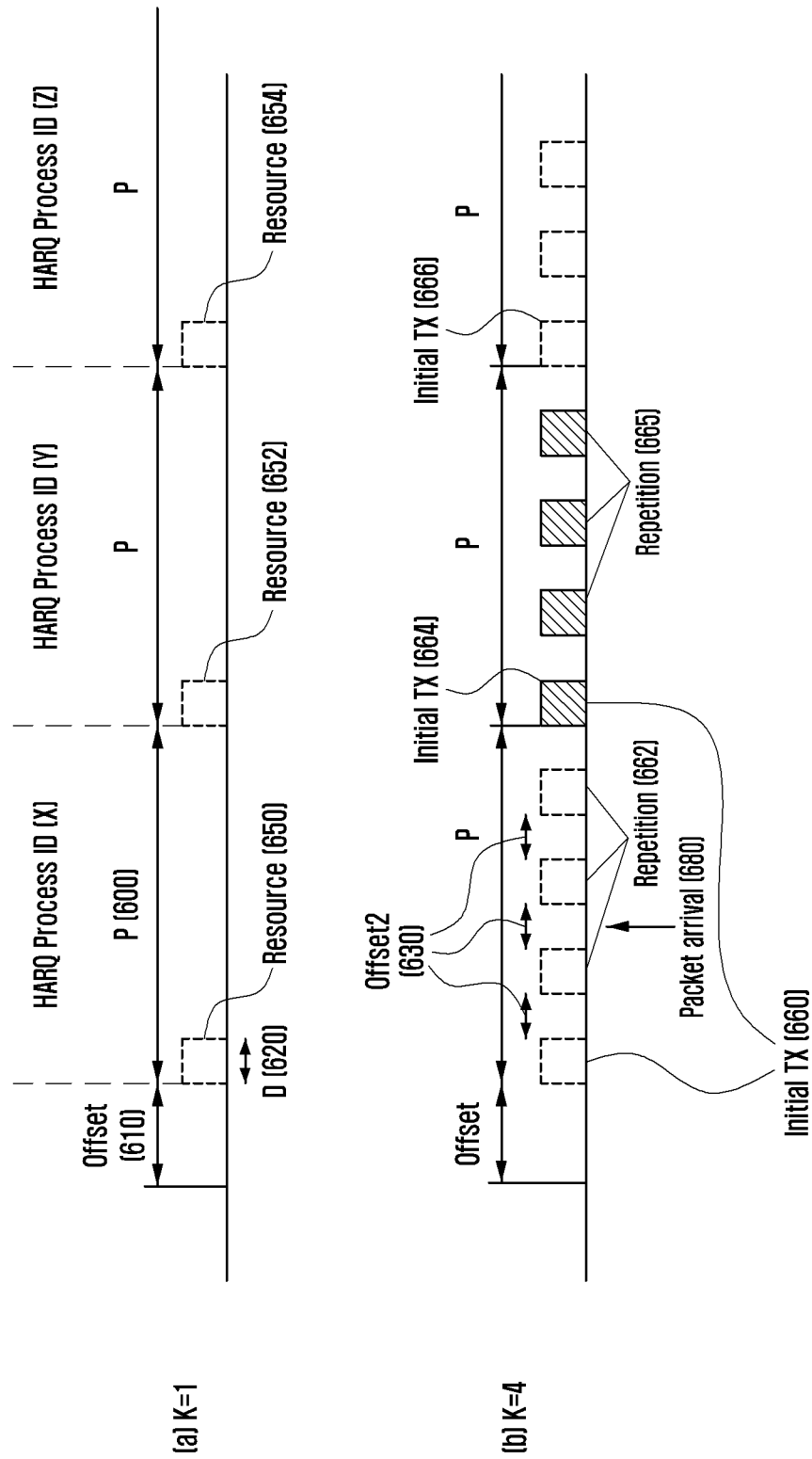
FIGS. 6A and 6B illustrate UL transmissions in a second UL transmission scheme according to an embodiment.
Figure 6B:
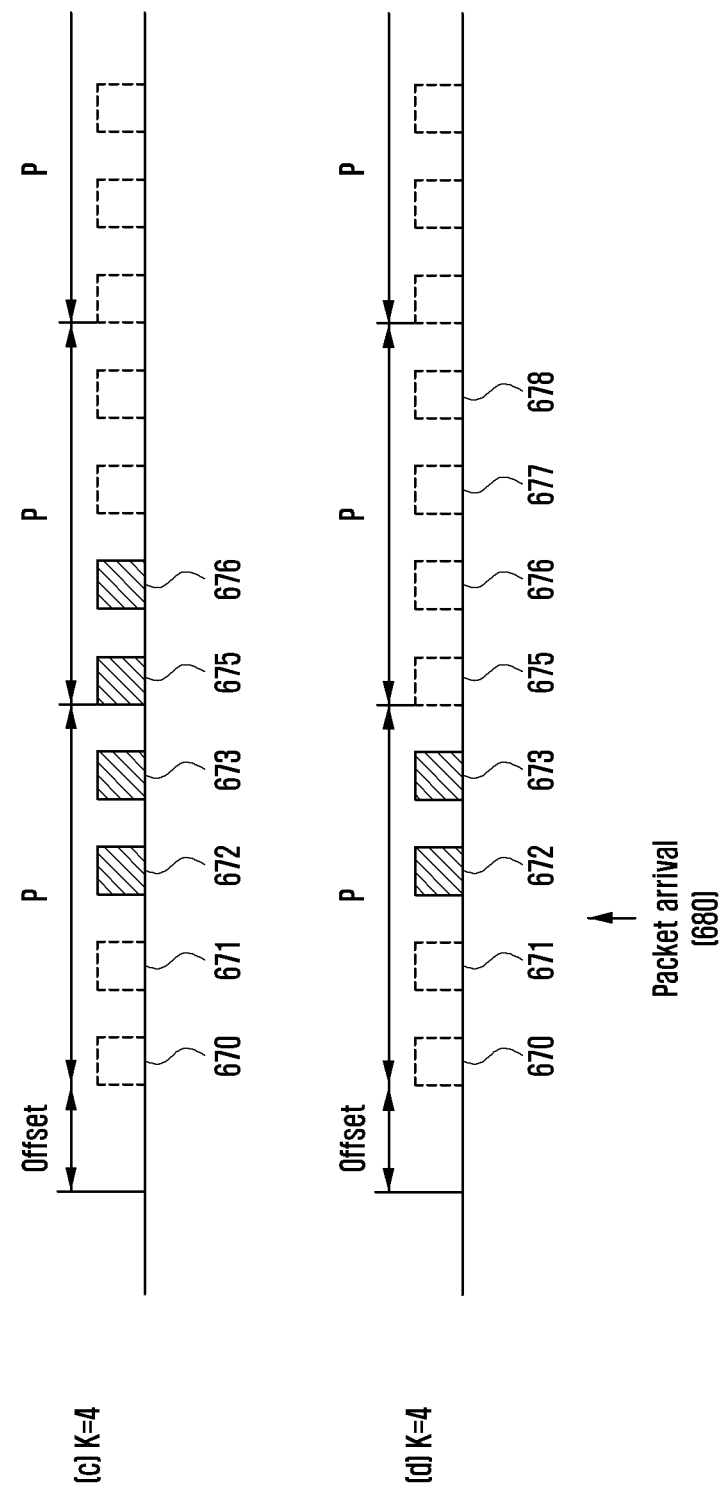

FIGS. 6A and 6B illustrate UL transmissions in the second UL transmission scheme according to an embodiment.

Referring to FIGS. 6A and 6B, a UE may receive period information 600 and an offset value 610 of the second UL transmission resources from the BS via higher layer signaling. The offset value 610 may be a value indicating a specific timing (e.g., system frame number 0), and the UE may be configured with the period and offset value, respectively. The offset value 610 may be one of the values in the range of the period 600, and UE may receive the periodic information 600 and the offset information 610 by using an index indicating both the period and offset value via higher layer signaling. The UE may determine the second UL transmission resources 650, 652, and 654 for the $N^{th}$ UL grant based on the configured period 600 and the offset 610, as shown in Equation (1). The description thereof is made hereinafter with a slot as a unit.

$$(SFN*NumSlotperSFN+Slot\_Index)=[(SFNstart\ time*NumSlotperSFN+slotstart\ time)+ N*semiPersistSchedhaerval+Offset] modulo\ 1024*NumSlotperSTN \qquad (1)$$

In Equation (1), the system frame number (SFN), the Slot_Index, and the Symbol Index denote the SFN, the slot, and symbol including the second UL transmission resources.

The NumSlotperSFN denotes a radio frame defined or configured for the second UL transmission per carrier or cell, or a number of slots during the time period of 10 ms, and the SFNstart time and slotstart time denote the SFN and slot at which a UL grant initiating the second UL transmission is received. The semiPersistSchedInterval denotes a scheduled interval of the second UL transmission resources. The offset value may be configured via higher layer signaling or the timing information (UL transmission slot and symbol timing value) included in the UL grant (e.g., control information scrambled with an SPS cell RNTI (C-RNTI)) initiating (activating) the second UL transmission, as shown in Equation (2).

The description thereof is made hereinafter with a symbol as a unit.

$$(SFN*NumSlotperSFN*SymbolPerSlot+SlotIndex\_in\_SF*SymbolPerSlot+Symbol\_Index)=[(SFNstart\ time*NumSlotperSFN*SymbolPerSlot+SlotIndex\_in\_SFstart\ time*SymbolPerSlot+symbolstart\ time)+N*semiPersistSchedInterval+Offset]\ modulo\ 1024*NumSlotperSFN*SymbolPerSlot \quad (2)$$

In Equation (2), the SFN and Slot_Index denote the SFN and slot including the second UL transmission resources, respectively. The NumSlotperSFN denotes a radio frame defined or configured for the second UL transmission per a carrier or cell, or a number of slots during the time period of 10 ms, and SymbolPerSlot denotes the number of symbols constituting a slot defined or configured for the second UL transmission per carrier or cell. The SlotIndex_in_SFstart time, SFNstart time, and symbolstart time denote the slot, the SFN, and the symbol within the slot, in which the UL grant initiating the second UL transmission is received. The semiPersistSchedInterval denotes a scheduled interval of the second UL transmission resources. The offset value may be configured via higher layer signaling or the timing information (UL transmission slot and symbol timing value) included in the UL grant (e.g., control information scrambled with an SPS C-RNTI) initiating (activating) the second UL transmission. When at least one symbol is indicated as a DL resource by a slot format indicator (SFI) among the resources scheduled for the second UL transmission scheme-based UL transmission, the UE may determine that the corresponding resources are not valid for the UL transmission in the second UL transmission scheme.

The UE may be configured to repetitively transmit a UL signal K times in the second UL transmission scheme. K denotes a number of repetitive transmissions including the initial transmission in the second UL transmission scheme and may be set to one of predetermined values including 1 (e.g., K=1, 2, 4, or 8) for the UE via higher layer signaling. A description is made in which K=4 by way of example, with reference to part (b) of FIG. 6A.

The UE may determine the resources for a UL signal transmission in the second UL transmission scheme based on at least one of the scheduled interval and offset value received via higher layer signaling, if the UE is configured to transmit a UL signal repetitively in the second UL transmission scheme, i.e., if K is set to a value greater than 1, K resources 600 and 662 are configured in the period (P) as shown in part (b) of FIG. 6A. The resources configured for the repetitive transmission may be determined based on offset 2 630 based on the resources configured under the assumption of K=1. The value of offset 2 630 or a distance (symbols or slots) between the resources for transmission in the second UL transmission scheme within the period (P) may be configured to the UE via higher layer signaling or calculated based on the scheduled interval and K value. For example, the offset and the distance between the second UL transmission resources may be calculated through floor (P/K).

The UE may receive at least one HARQ process ID for the UL transmission being performed in the second UL transmission scheme configured as above via higher layer signaling. The HARQ process ID may be calculated for the scheduled resources as shown in Equation (3).

$$HARQ\ Process\ ID = floor\ (X/P) \bmod NumHARQproc \quad (3)$$

In Equation (3), X denotes SFN*SlotPerFrame*SymbolPerSlot+Slot_index_In_SF*SymbolPerSlot+Symbol_Index_In_Slot, and NumHARQproc denotes a number of HARQ processes configured for the UL transmission in the second UL transmission scheme, NumHARQproc being received from the BS via higher layer signaling. Accordingly, X denotes the first symbol of the initial transmission in performing the transmission K times.

Referring to FIGS. 6A and 6B, it is determined that the HARQ process ID for the K repetitive transmissions 660 and 662 is X, which is determined based on the initial transmission resources 660. The HARQ process ID for the initial transmission 664 and retransmissions 665 in the next period is Y, which is determined based on the initial transmission resources 664. Although the initial transmission is performed with resources configured differently as in parts (c) and (d) of FIG. 6B, the HARQ process ID is determined based on the time (slot or symbol) at which the initial transmission is performed among the K transmissions. The value of X may be determined based on the time (slot or symbol) of the resources configured with an initial RV value in the period (P) among the resources configured with the RV, for use in the second UL transmission scheme, set to a specific value r (e.g., 0) by the BS via higher layer scheduling. Consequently, the HARQ process IDs for the UL resources for transmission in the second UL transmission scheme within the configured period (P) are identical to each other.

Within the period P configured as above, K second UL transmission resources may exist in two manners. The initial transmission resources for use in the second UL transmission scheme and the retransmission resources for use in the second UL transmission scheme may be distinguished from each other as illustrated in part (b) of FIG. 6A or may not be distinguished from each other as illustrated in parts (c) and (d) of FIG. 6B. In parts (c) and (d) of FIG. 6B, if a signal to be transmitted by the UE is generated, as denoted by reference number 680, the UE may perform the initial transmission and retransmissions of the UL signal, using the resources configured for the second UL transmission scheme, in the second UL transmission scheme since the generation of the signal.

In part (b) of FIG. 6A, because the resources for initial transmission in the second UL transmission scheme is scheduled according to the period (P), if the signal 680 to be transmitted in UL is generated in the middle of the period (P), the UE delays the signal transmission till the resources 664 available for initial transmission in the second UL transmission scheme, resulting in signal transmission latency. The BS that receives the signal transmitted in the second UL transmission scheme may receive the UL transmission efficiently because the resources or period available for the initial transmission of the UE is explicitly scheduled. That is, the BS and the UE share the information on the second UL signal transmission resources and the HARQ process ID configured with the corresponding resources in order to minimize malfunctioning therebetween.

In order to minimize the UL transmission latency, the UE may transmit the signal on the resources that are determined available first, since the generation of the signal, as denoted by reference number 680, for the UL transmission among the resources scheduled for the second UL transmission scheme-based t transmission without distinction between the initial transmission resources and K−1 retransmission resources for the second UL transmission scheme as illustrated in part (c) of FIG. 6B. Here, it is possible to improve the reliability of the UL signal by transmitting the UL signal K times as configured.

The resources for use in retransmission may be assigned a different HARQ process ID Y when the UE performs the initial transmission of the UL signal (HARQ process ID is X at initial transmission) in the middle of the period (P) and retransmits the UL signal K−1 times, as illustrated in part (c) of FIG. 6B. In this case, the BS may fail to distinguish between the UL transmissions that are performed with the respective HARQ process IDs X and Y in the second UL transmission scheme. In part (c) of FIG. 6B, if the BS receives the UL transmissions 675 and 676 without receipt of the UL transmissions 672 and 673, the BS may determine that the UL transmissions have been performed with the HARQ process ID Y. Consequently, the BS may not correctly determine the HARQ process ID associated with the UL transmissions. If the UE uses different UL transmission parameter values for the retransmissions (e.g., retransmissions with different RV values or RV cycling values), this may increase the UL signal reception complexity of the BS.

In order to minimize the UL transmission latency, the UE may transmit the signal on the resources that are determined available first, after the generation of the signal, for the UL transmission among the resources scheduled for the second UL transmission scheme-based UL transmission, without distinction between the initial transmission resources and K−1 retransmission resources for the second UL transmission scheme, as shown in part (c) of FIG. 6B, in order to minimize the reception complexity of the BS, it may be possible to use the following method. The resources for use in retransmission may be assigned a different HARQ process ID Y when the UE performs the initial transmission of the UL signal (at this time, HARQ process ID is X) in the middle of the period (P) and retransmits the UL signal K−1 times as illustrated in part (d) of FIG. 6B. The UE may transmit, in the second UL transmission scheme, the UL signal only on the resources configured with the HARQ process ID assigned for initial UL transmission in the second UL transmission scheme.

Accordingly, it is possible to minimize the reception complex % of the BS in such a way that the UE transmits the UT signal M(−=K) times on the resources 672 and 673 configured with the HARQ process ID for the initial transmission 672, among K transmissions scheduled as above, and does not perform transmissions on the resources 675 and 676 configured with the HARQ process ID Y that differs from the initial transmission HARQ process ID X. However, this may also decrease the UL transmission reliability because the UE does not perform K scheduled retransmissions.

When the UE is configured to perform K (K>1) repetitive transmissions including the initial transmission in the second UL transmission scheme, the latency, reliability, and BS complexity may be changed according to the UL resource configuration method and the K-time retransmission method for the second UL transmission of the UE. Accordingly, the BS may configure the UL resource configuration method and the K-time retransmission method for the second UL transmission of the UE differently in consideration of the latency, reliability, and complexity.

Method 1: Second UL transmission scheme determination based on a number of HARQ process IDs configured for second UL transmission scheme.

A UE configured to perform UL transmissions in the second UL transmission scheme may configure the UL resource configuration method and the K-time retransmission method for the second UL transmission according to the number of HARQ process IDs configured for the UL transmission in the second UL transmission scheme.

A UE configured with L HARQ process IDs (e.g., 1 HARQ process ID) may perform K transmissions, i,e., one initial transmission and K−1 retransmissions, in the second UL transmission scheme on any of the resources available for transmission in the second UL transmission scheme configured based on the above Equation, without distinction between the resources for the initial transmission and the resources for K−1 retransmissions among the K transmissions scheduled in the second UL transmission scheme. That is, the UE may transmit the signal K times (including the initial transmission) in the UL transmission scheme on the resources determined available first, since the generation of the signal, as denoted by reference number 680 for UL transmission among the resources scheduled for UL transmission in the previously configured second UL transmission, as illustrated in part (c) of FIG. 6B, For example, if L=1, i.e., the number of configured HARQ process ID is 1, the UE may perform the initial transmission of the UL signal on one of the resources available for the UL signal transmission in the second UL transmission scheme and K−1 retransmissions of the UL signal on the subsequent resources available for the UL signal transmission, as illustrated in part (c) of FIG. 6B.

The UE may not transmit a new signal or data with the HARQ process ID in use for the transmission in the second UL transmission scheme before receipt of the HARQ-ACK information from the BS or a timer for determining ACK/NACK corresponding to the transmission expires. The timer may start when the UE starts transmitting the UL signal. Accordingly, it is possible for Method 1 to minimize the signal reception complexity of the BS.

The scenario in which the UE can perform K transmissions, i.e., one initial transmission and K−1 retransmissions, in the second UL transmission scheme on any of resources available for transmission in the second UL transmission scheme configured based on the above Equation, without distinction between the resources for the initial transmission and the resources for K−1 retransmissions among the K transmissions scheduled in the second UL transmission scheme, may be limited to the follow case.

By limiting the above-described method to the case of being configured to perform K transmissions via a specific value of a redundancy version (RV) (self-decodable RV value (typically RV0) capable of decoding the signal correctly although the BS receives the UL signal once among K transmissions) that is in use for the second UL transmission scheme of the CE, it is possible to minimize the reception complexity of the BS in receiving the UL signal transmitted in the second UL transmission scheme. Although the restriction is made to RV 0 (or RV sequence 0-0-0-0) by way of example, the above-described repetitive transmission may be applied even when the RV is set to another self-decodable RV value (e.g., RV0) or the RV values of the K repetitive transmissions are set only to RV0 and RV3 (e.g., RV sequence: 0, 3, 0, 3).

The UE configured with P (>L) HARQ process IDs (e.g., 2 or more HARQ process IDs) for the second UL transmission scheme may perform the initial transmission in the second UL transmission scheme on any of resources available for UL transmission in the second UL transmission scheme, without distinction between the resources for the initial transmission of the signal and the resources for k−1 retransmissions among the K transmissions scheduled in the second UL transmission scheme, but may not use the resources configured with the HARQ process ID different from that for the initial transmission and may stop the repetitive transmission as illustrated in part (d) of FIG. 6B. That is, the UE may transmit the signal, in the second UL transmission scheme, on the resources determined available first, after the generation of the UL signal to be transmitted, as denoted by reference number 680, for UL transmission among the resources scheduled for the transmission in the previously configured second transmission scheme and retransmit the signal less than K times according to the first signal transmission time point.

For example, if L=2, i.e., the number of HARQ process ID is 2, the UE may transmit the UL signal on the resources 672 and 673 appearing after the generation of the UL data, as denoted by reference number 680 among the resources 670, 671, 672, and 673 configured with the HARQ process ID X in the second UL transmission scheme, and then stop the UL signal transmission as illustrated in part (d) of FIG. 6B. That is, the UE does not transmit the UL signal on the resources 675, 676, 677, and 678 configured with a HARQ process ID, i.e., HARQ process ID Y different from the HARQ process ID X for the initial transmission. If there is new data at the UE, in addition to the UL data transmitted with the HARQ process ID X, the UE may transmit the new data K times on the UL resources 675, 676, 677, and 678 configured with the HARQ process ID Y.

Method 2: Second UL transmission resource configuration and second UL transmission scheme configuration via higher layer signaling.

The BS may configure the second UL transmission resource and UL transmission scheme to the UE via higher layer signaling. That is, the BS may make a configuration for the UE to perform the initial transmission in the second UL transmission scheme on any of the resources, without distinction between the resources available for the initial transmission and the resources available for K−1 retransmissions scheduled for second UL transmission scheme-based UL transmission, as illustrated in parts (c) and (d) of FIG. 6B, or for the UE to perform the initial transmission in the second UL transmission scheme only on the resources scheduled for the initial transmission among the resources, with the distinction between the resources available for the initial transmission and the resources available for K−1 retransmissions scheduled for the second UL transmission scheme-based UL transmission, as illustrated in parts (b) of FIG. 6A A UE may be configured to perform the initial transmission in the second UL transmission scheme on any of the resources, without distinction between the resources available for the initial transmission and the resources available for K−1 retransmissions scheduled for second UL transmission scheme-based UL transmission, as illustrated in parts (c) and (d) of FIG. 6B. The UE configured to perform K (K>1) transmissions in the second UL transmission scheme may perform the K transmissions including the initial transmission as illustrated in part (c) of FIG. 6B or perform the K transmission only to the transmission resources with the same HARQ process ID as that configured for the initial transmission (or for the K scheduled transmissions, the UE does not perform the second UL transmission scheme-based UL transmission on the resources with the HARQ process ID different from the HARQ process ID configured for the initial transmission), as illustrated in part (d) of FIG. 6B.

Method 3: Configuration for performing an initial transmission, among K second UL transmission scheme-based repetitive transmissions, on part of resources available for second UL transmission scheme-based UL transmission.

As illustrated in part (c) of FIG. 6B, the LTE may transmit the signal K times (including the initial transmission) in the second UL transmission scheme on the resources determined available first, since the generation of the signal as denoted by reference number 680, for the UL among the resources scheduled for the second UL transmission scheme-based UL transmission. For example, the UE may transmit the signal on one of the resources scheduled for the second UL transmission scheme-based UL signal transmission and retransmit the signal K−1 timers, as illustrated in part (c) of FIG. 6B. In this case, the UE may perform the initial transmission of the K repetitive transmissions scheduled in the second UL transmission scheme on any of F resources counted from the first one of the M UL transmission resources configured with the HARQ process ID for the transmission and the UE may perform retransmission only on the remaining M-F resources. This method may minimize the reception complexity of the BS in receiving the UL signals transmitted in the second UL transmission scheme. For example, the value of F may be determined as half the K configured with the HARQ process ID, i.e., floor (K/2) or coil (K/2). It may also be possible for the BS to configure the value of F to the UE via higher layer signaling. In this case, the UE may perform the repetitive transmissions including the initial transmission on the F resources among K scheduled transmissions.

A scenario in which the UE can perform the initial transmission and retransmissions of the K repetitive transmissions in the second UL transmission scheme on any of F resources among the resources available for the UL transmission in the second UL transmission scheme configured through the above Equation, without distinction between the resources available for the initial transmission and the resources available for the K−1 retransmissions in the second UL transmission scheme, may be limited.

For example, it may be possible to limit the above-described method to the case of being configured to perform K transmissions via a specific value of a RV (self-decodable RV value (typically RV0) capable of decoding the signal correctly although the BS receives the UL signal once among K transmissions) that is in use for the second UL transmission scheme of the UE. This method may make it possible to minimize the reception complexity of the BS in receiving the UL signal transmitted in the second UL transmission scheme. Although the restriction is made to RV 0 (or RV sequence 0-0-0-0), by way of example, the above-described repetitive transmission may be applied even when the RV is set to another self-decodable RV value (e.g., RV3) or the RV values of the K repetitive transmissions are set only to RV0 and RV3 (e.g., RV sequence: 0, 3, 0, 3).

It may be possible to determine the resources for the initial transmission and K−1 retransmissions among K repetitive transmissions scheduled in the second UL transmission scheme through one or any combination of Method 1, Method 2, and Method 3.

It may be possible to consider a case where multiple UL BWPs including UL and supplementary UL (SUL) BWPs are configured for the second UL transmission in one serving cell and the multiple BWPs configured for the second UL transmission are simultaneously activated in the cell. If the UE should select one of the multiple UL MVPs or select one of multiple second UL transmissions to perform transmission (e.g., the second UL transmission scheduled in the UL and SUL BWPs at a specific time or slot in the serving cell, the second UL transmission is scheduled in multiple MVPs among the UL or SUL MVPs in a slot, or multiple BWPs are activated among the BWPs configured with the second UL transmission), the UE may select second UL transmission resources in the activated BWP in which the second UL transmission resources are configured. The UE may also select the BWP or cell in which the second UL transmission resources are configured, e.g., when the UE wants to transmit UL, data in the second UL transmission configured in the UL and SUL bands at a specific time or slot, when the UE wants to transmit the same or different UL data in multiple UL BWPs in UL and SUL bands, or when the UE wants to transmit different UL data in all of the second UL transmissions configured in the respective UL and SUL MVPs at a specific time or slot. The cell configured for the UL data channel (e.g., a PUSCH) transmission includes the SUL and a UL BWP configured for the PUSCH transmission may be allocated in the SUL. The SUL denotes a UL carrier added to a specific cell for securing UL coverage of the UE. If the UE is configured with two UL carriers in one cell, the additionally configure UL carrier is referred to as an SUL.

The UE may be configured with a UL cell (e.g., an SUL) in addition to a specific UL serving cell (e.g., a UL) for securing UL coverage. The UL and SUL frequency bands or frequency bandwidths may be independently configured to the UE, and the UL and SUL BWPs may also be independently configured to the UE. At least one BWP may be activated in each of the UL and SUL bands. That is, the UE may have one BWP configured in the UL band and another BWP configured in the SUL band, and the BWPs may be activated independently.

Although the descriptions herein are directed to one BWP being activated in each of the UL and SUL band for convenience of explanation, the present disclosure is also applicable to multiple BWPs being configured for a UE in the UL or SUL band and they are activated independently.

When the second UL transmission is configured and activated independently in the BWPs of the UL and SUL bands, the second UL transmission may be configured and activated in all BWPs activated in the UL and SUL bands at a specific time or slot. When performing the second UL transmission in only one BWP at the specific time or slot, the UE should determine the BWP and the second UL transmission configuration and resources for use in performing the second UL transmission. This determination operation of the UE may not be necessary for the UL data transmission in the first UL transmission scheme, because the UL grant for configuring the UL data transmission includes an indicator indicating whether the UL data transmission is to be performed in the UL or SUL bandwidth.

Although the LTE determines the BWPs in the UL and SUL bands and the second UL transmission configuration for use in performing the second UL transmission in the above description by way of example, the present disclosure may be used for other scenarios, such as when the UE determines the resources for use in performing the second UL transmission in a situation where multiple configurations and or resources that can be used for the second L transmission at a specific time or slot in a cell. When there are multiple resources activated for the second UL transmission of the UE at a specific time or slot may include that the multiple UL transmission resources are completely identical in the time domain in a specific time or slot and that the multiple second UL transmission resources are identical in the time domain in at least one symbol.

In the above case, the UE may use at least one of Methods A to F, as described below, to determine the BWP and the second UL transmission configuration and resources for use in performing the second UL transmission.

Method A: The UL transmission is performed using the second UL transmission resources configured in a default cell (or carrier), default BWP, or cell or BWP configured for PUCCH transmission. When multiple second UL transmission configurations are all configured to the default cell, default carrier, or default BWP, a second UL transmission may be selected using at least one of other methods of the present disclosure.

In Method A, the second UL transmission resources activated in the BWPs are activated respectively in UL and SUL bands at a specific time or slot and overlapped. The UE may perform the second UL transmission using the second UL transmission resources and configurations of the default cell or default carrier, the second UL transmission resources and configurations of the BWP configured as the default BWP, or the second UL transmission resources and configurations of the cell or BWP configured for PUCCH transmission, among the second UL transmission resources. If the BS configures the default cell, default carrier, or default MVP, if the BS transmits a UL control channel using a specific cell or BWP, or if the eNB configure a default cell, default carrier, or default BWP via higher layer signaling, this may indicate that the BS intends to use a supplementary cell, carrier, or BWP in addition to the cell, carrier, or BWP. Thus, the UE may preferentially perform the second UL transmission using the second UL transmission resources of the default cell, default carrier, or default BWP.

Method B: The UE may determine a second LT transmission type and resources according to the configured second UL transmission scheme type. If all of the second UL transmission configurations fall into the same second UL transmission type, the UE may select the second UL transmission using at least one of the methods of the present disclosure.

In Method B, the UE may prefer the second UL transmission scheme of a type activating the second UL transmission and resources using a DL control channel among the second UL transmission types configured as above and perform the second UL transmission using the second UL transmission resources configured in the corresponding second UL transmission scheme. The second UL transmission type activating the second UL transmission and its resources using the DL control channel in which the configured second LTL transmission and resources are activated by a DL control signal transmitted by the BS may be preferentially selected in comparison with the second UL transmission type activating the second UL transmission and its resources without the DL control channel such that the UE performs the second UL transmission in the preferentially selected type. The UE may also select the second UL transmission type activating the second UL transmission and its resources with no DL control channel to perform the second UL transmission in the preferentially selected type.

Method C: The UE may perform the second UL transmission on the second UL transmission resources with a short scheduled interval among the configured second UL transmission. If the short interval is used, the UE may select the second UL transmission using one of the methods of the present disclosure.

In Method C, the BS may configure the second UL transmission resources with the short scheduled interval (or semiPersistSchedInterval) in order for the UE to perform the second UL transmission more quickly for supporting low-latency services. The low-latency high reliability services are assigned a priority higher than those of other services so as to be well-supported. Thus, the UE may perform the second UL transmission on the second UL transmission resources with the short scheduled interval preferentially among the second LCL transmissions scheduled. When the UE performs the second UL transmission on the second UL transmission resources with the short scheduled interval, the second UL transmission on the second UL transmission resources with a long scheduled interval is more delayed until the next resources becomes available, and thus, if necessary, the UE may perform the second UL transmission on the second UL transmission resources with the long scheduled interval.

Method D: The UE may perform the second UL transmission on the resources available for the initial transmission among the overlapped second UL transmission resources. If all of the overlapped second UL transmission resources are the resources available for the initial transmission, the UE may select the second UL transmission using one of the methods of the present disclosure.

In Method D, the UE configured to perform the repetitive transmission may determine the second UL transmission and its resources determined as the resources available for the initial resources, according to the initial transmission determination method of the present disclosure. That is, the UE may preferentially select the resources configured for transmitting the second UL signal with RV=0 (or RV=3) among the second UL transmission resources and transmit the second UL signal on selected resources. Therefore, when the second UL transmissions are activated in the overlapped manner, the UE may select the resources configured for transmission with RV=0 (or RV=3) and perform the second UL transmission on the selected resources.

Prioritizing RV=0 or RV=3 results in prioritizing a self-decodable RV, and thus, it may also be possible to prioritize another RV value. For example, if the UE is configured to use the RV sequence {0, 2, 3, 1}, the UE may always perform the initial transmission of the UL signal only on the first resources during the second UL transmission resource period. If the UE is configured to use the RV sequence {0, 3, 0, 3}, the UE may always perform the initial transmission of the UL signal only on the first and second resources during the second L transmission resource period. If the UE is configured to use the RV sequence {0, 0, 0, 0}, the UE may always perform the initial transmission of the UL signal on all of the resources during the second UL transmission resource period. When the UE is configured to use the RV sequence {0, 0, 0, 0}, if the number of repetitive transmissions including the initial transmission is set to 8, the UE may always perform the initial transmission of the UL signal on the resources within the first to seventh resources during the second UL transmission resource period.

Method E: The UE may be configured with a priority order via higher layer signaling.

In Method E, there are multiple activated resources on which the UE is capable of performing the second UL transmission at a specific time or slot, and the UE may receive priority order information for use in prioritizing the resources for the second UL transmission from the BS. The UE may also determine the resources to be used preferentially for the second UL transmission based on a quality of service (QoS) of the data to be transmitted through the second UL transmission or priority of logical channel of the transmission.

Method F: The UE may perform the second UL transmission on the resources with at least one preconfigured symbol among the second UL transmission resources.

When there are multiple activated resources on which the UE is capable of performing the second UL transmission at a specific time or slot, the UE may determine the resources for the second UL transmission based on at least one of the Method A to Method F. The BS may attempt to receive a signal on all of the activated second UL transmission resources including UL and SUL, regardless of where the UE transmits a UL signal, in order to determine whether the UE performs a second UL, transmission.

Figure 7:
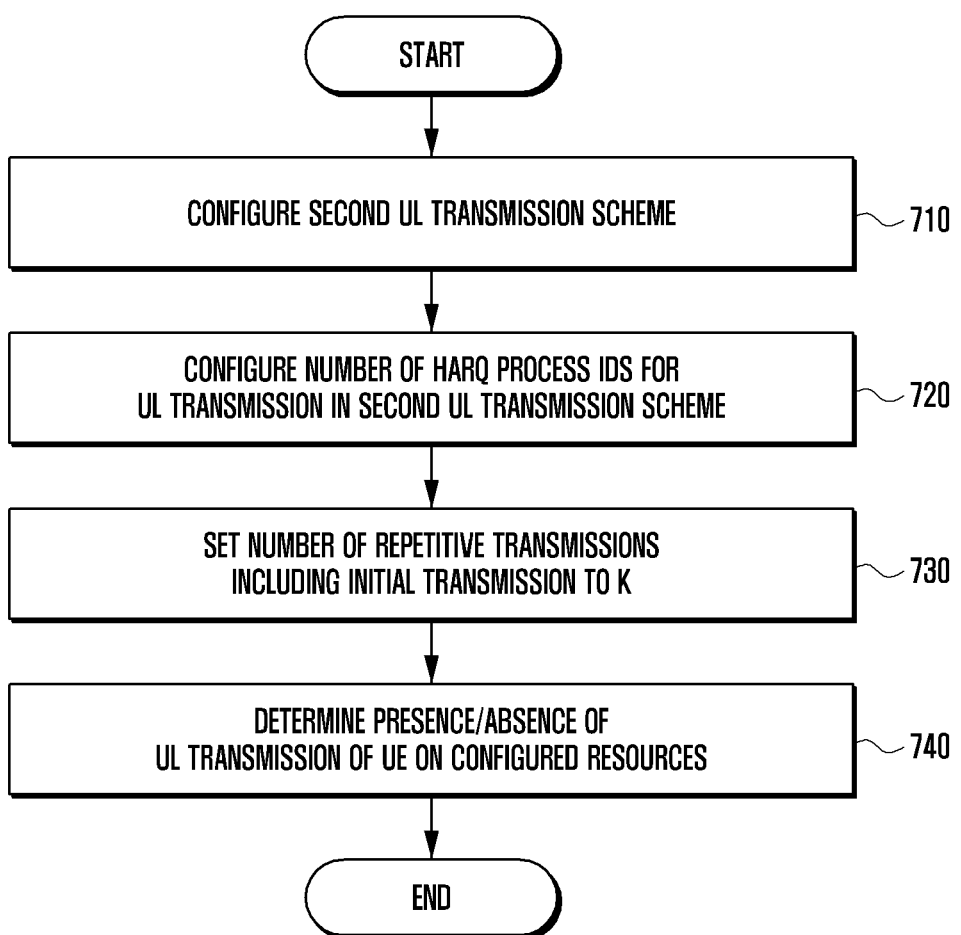
FIG. 7 is a flowchart illustrating a second UL transmission method of a base station according to an embodiment.

FIG. 7 is a flowchart illustrating a second UL transmission method of a BS according to an embodiment.

Referring to FIG. 7, in step 710, the BS configures a UE to perform a UL signal transmission using at least one UL transmission scheme for use in UL transmission of the BS or cell via at least one of a higher layer signal, a broadcast channel, and a DL control channel.

In step 710 the configuration information of at least one of the time resource region and frequency resource region in the resources for performing the second UL transmission, DMRS sequence for use in the LW transmission, DMRS-related information, such as DMRS cyclic shift, and UCI detection resources for configuring retransmissions of the second UL transmission or PDCCH search space region information may be transmitted along with the interval of the second UL transmission resources. For example, such information may be transmitted or configured to the UE via at least one of a higher layer signal, a broadcast channel, and a DL control channel. The UE may also receive all or part of variables for UL transmission configuration, which include the time and frequency resource regions, MCS information for use in the second UL transmission, a TTI length, a second UL transmission start symbol in a slot, channel access procedure-related configuration information for the second UL transmission for an unlicensed band transmission, and candidate values selectable by the UE for variables or the above values, as well as the time and frequency resource regions. When the UL transmission configuration is of the unlicensed band, the BS may set the variables related to the UL channel access procedure differently according to the UL transmission scheme configured in step 710.

In steps 720 and 730, the BS configures, to the UE, a number of HARQ process IDs, HARQ process ID value and a number of repetitive transmission K (here, K may include the initial transmission) for the UL transmission in the second UL transmission scheme configured to the UE in step 710. Alternatively, steps 720 and 730 may be included in step 710 such that the aforementioned information is configured or transmitted to the UE.

In step 740, the BS determines whether the UE performs UL transmission according to the UL transmission scheme configured through steps 710, 720, and 730. If it is determined that the UE performs UL transmission according to the configured scheme, the BS performs decoding on the UL transmission to determine whether the UL signal is received correctly. If it is determined that the UL signal is received correctly, the BS may avoid notifying the UE of the reception result, transmit, to the UE, the result of the determination made in step 740 to indicate whether the UL signal is received successfully, or transmit UL configuration information for configuring UL initial signal transmission according to the first UL transmission scheme. If it is determined in step 740 that the UL signal transmitted by the UE is not received correctly, the BS may configure retransmissions of the UL signal to the UE.

Figure 8:
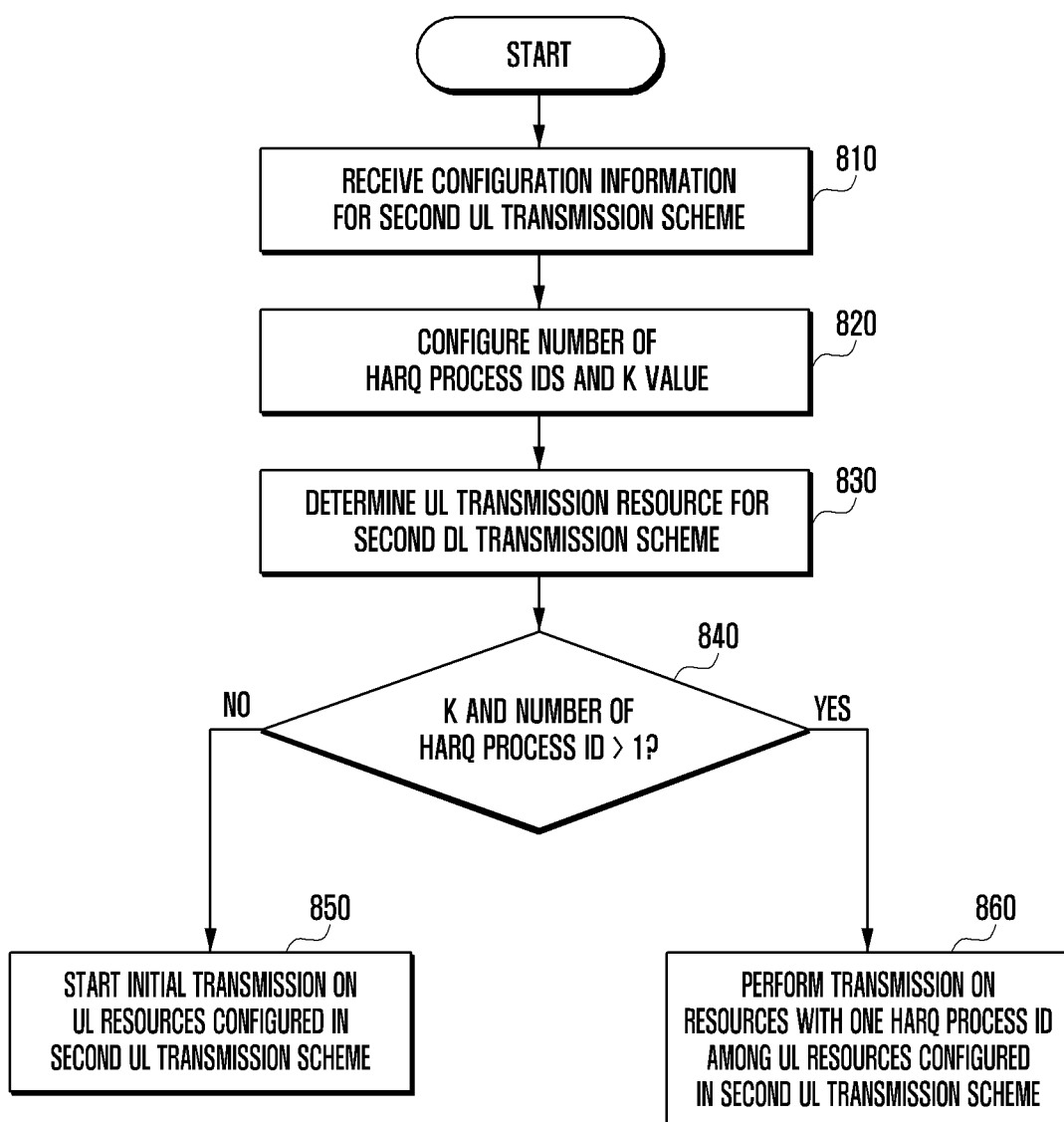
FIG. 8 is a flowchart illustrating a second UL signal transmission resource and repetitive transmission resource configuration method of a user equipment (UE) according to an embodiment.

FIG. 8 is a flowchart illustrating a second UL signal transmission resource and repetitive transmission resource configuration method of a UE according to an embodiment.

Referring to FIG. 8, in step 810, the UE receives configuration information from the BS, which includes at least UL transmission scheme a first UL transmission scheme, a second UL transmission scheme, or a combination of first and second transmission scheme) for UL transmission to the a BS or cell via at least one of a higher layer signal, a broadcast channel, and a DL control channel.

In step 820, the UE is configured with the configuration information received from the BS, which includes variable values for UL transmission in the UL transmission scheme configured in step 810. For example, the UE configured with the second UL transmission method may receive all or part of the variables for configuring the UL transmission, the variables including a time resource region and a frequency resource region for performing the second UL transmission configured by the BS, DMRS-related information such as DMRS sequence and DMRS cyclic shift for use in the UL transmission, resource region configuration information for at least one of UCI detection resources for configuring retransmission of the second UL transmission and a PDCCH search space region, an MCS for use by the UE in the second UL transmission, a cyclic shift, a TTI length, a second UL transmission start symbol in a slot, configuration information related to channel access procedure for the second UL transmission, and candidate values of the variables that can be selected by the UE. At least one of the variables related to the UL channel access procedure configured in step 820 may differ according to at least one of the UL transmission scheme configured in step 810, UL transmission band, and frame structure type of the band for use in the UL transmission.

In step 820, the UE may be further configured with a HARQ process ID value, a number of HARQ process IDs, and a number of repetitive transmission (K) for the UL transmission being performed in the second UL transmission scheme.

In step 830, the UE determines the UL transmission resource for use in the second UL transmission scheme based on the confirmation values and Equations (1) and (2) above.

If it is determined in step 840 that both the number of HARQ process IDs and the number of repetitive transmissions including the initial transmission, which are configured in step 820, are greater than 1, or if both the number of HARQ process IDs and the number of repetitive transmissions including the initial transmission and if the RV for the transmission is set to 0, in step 860, the UE performs the transmission on the resources with one HARQ process ID among the UL resources configured in the second UL transmission scheme. That is, the second UL, transmission scheme-based transmission is not performed with different HARQ process IDs, as illustrated in part (b) of FIG. 6A or part (d) of FIG. 6B.

That is, the resources for the initial transmission among the K transmissions may be designated in the second UL transmission scheme, as illustrated in part (b) of FIG. 6A. It may also be possible that some of the K transmissions take place in such a way that the UE performs the repetitive transmission on the resources configured with the HARQ process ID identical to that for the initial transmission among the K transmissions, as illustrated in part (d) of FIG. 6B, although no resource for the initial transmission among the K transmissions is designated.

If it is determined in step 840, that at least one of the number of HARQ process IDs configured in step 820 and the number of repetitive transmissions including the initial transmission configured in step 820 is not greater than or equal to 1, the UE determines that no resource is configured for use in the initial transmission among the K transmissions in the second UL transmission scheme, and performs all of the K transmissions in step 850, as illustrated in part (c) of FIG. 6B.

Figure 9:
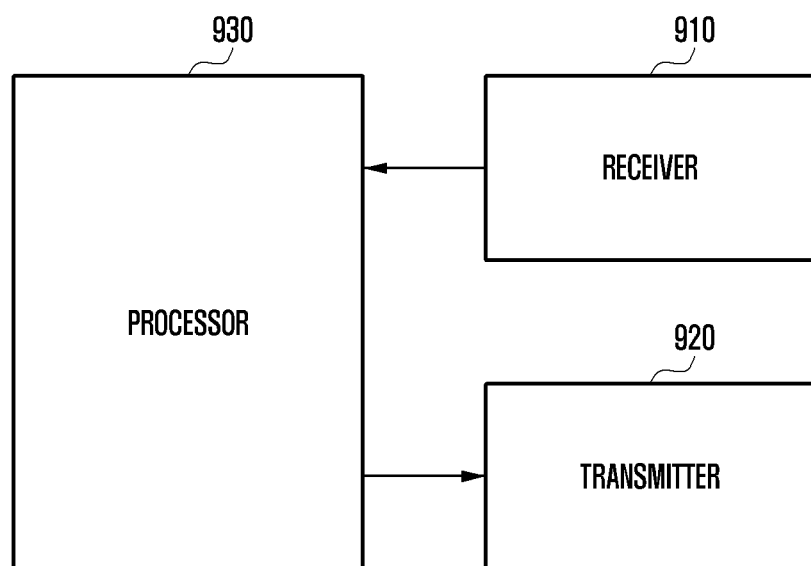
FIG. 9 illustrates a BS according to an embodiment.

FIG. 9 illustrates a BS according to an embodiment.

Referring to FIG. 9, the BS includes a receiver 910, a transmitter 920, and a processor 930. The receiver 910 and the transmitter 920 may be collectively referred to as a transceiver. The transceiver may transmit and receive signals to and from a UE. The signals may include control information and data. The transceiver may include a radio frequency (RF) transmitter for frequency-up-convening and amplifying a signal to be transmitted and an RF receiver for low-noise-amplifying and frequency-down-converting a received signal. The transceiver may output the signal received over a radio channel to the processor 930 and transmit the signal output from the processor 930 over the radio channel.

The processor 930 may control overall operations of the BS. For example, the processor 930 may determine a second signal transmission timing and control to generate the second signal transmission timing information to be transmitted to the UF. The transmitter 920 may transmit the timing information to the UE, and the receiver 910 may receive the second signal at the timing.

As an another example, the processor 930 may make a configuration for the UE to perform UL transmission with at least of the first and second UL transmission scheme and transmit, to the UE, the UL transmission configuration information including the UL channel access procedure defined according to the configured UL transmission scheme by using the transmitter 910. The processor 930 may control to generate DL control information (DCI) including second signal transmission timing information. In this case, the DCI may indicate the inclusion of the second transmission timing information.

Figure 10:
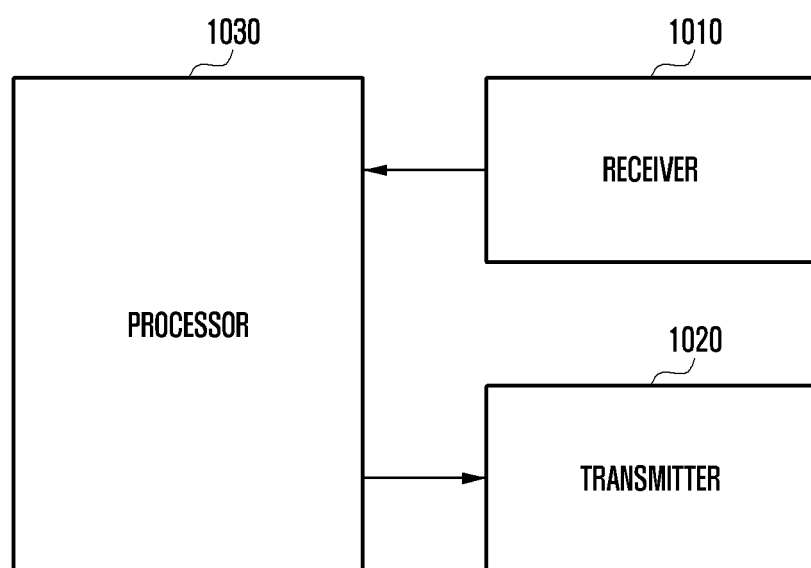
FIG. 10 illustrates a UE according to an embodiment.

FIG. 10 illustrates a UE according to an embodiment.

Referring to FIG. 10, the UE includes a receiver 1010, a transmitter 1020, and a processor 1030. The receiver 1010 and the transmitter 1020 may be collectively referred to as a transceiver. The transceiver may transmit and receive signals to and from a BS. The signals may include control information and data. The transceiver may include an RF transmitter for frequency-up-converting and amplifying a signal to be transmitted and an RF receiver for low-noise-amplifying and frequency-down-converting a received signal. The transceiver may measure the strength of the signal received over a radio channel and outputs the signal to the processor 1030, which compares the received signal strength with a predetermined threshold value to perform a channel access operation, and transmit the signal output from the processor 1030 over the radio channel according to the channel access operation result. The transmitter may also receive a signal over the radio channel and output the signal to the processor 1030 and transmit a signal output from the processor 1030 over the radio channel.

The processor 1030 may control overall operations of the UE, For example, the processor 1030 may control the receiver 1010 to receive a signal including the second signal transmission timing information and interpret the second signal transmission timing information. Thereafter, the transmitter 1020 may transmit the second signal at the timing.

As described above, various embodiments of the present disclosure are advantageous in terms of transmitting data of different types of services efficiently in a communication system. Also, the various embodiments of the present disclosure are advantageous in terms of satisfying service-specific requirements, reducing transmission time delay, and facilitating use of at least one of frequency-time and spatial resources and transit power by providing a method of allowing coexistence of data transmissions of homogeneous services or heterogeneous services.

Although various embodiments of the disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure. If necessary, the embodiments may be combined in whole or in part. For example, some of embodiments of the present disclosure may be combined to form an embodiment for the operations of a BS and a terminal. Although the embodiments are directed to an NR system, they may also be applied to other systems, such as FDD and TDD LTE systems, to form other alternative embodiments without departing from the spirit and scope of the present disclosure.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method performed by a terminal in a wireless communication system, the method comprising:
receiving, from a base station, grant-free uplink transmission configuration information via higher layer signaling, the grant-free uplink transmission configuration information including a number of repetitive transmissions, a redundancy version (RV) sequence for a grant-free uplink transmission, a number of hybrid automatic repeat request (HARQ) process for the grant-free uplink transmission, and period information for the grant-free uplink transmission;
identifying a resource among resources for the number of the repetitive transmissions as an initial transmission based on the RV sequence; and
performing the initial transmission of uplink data on the identified resource to the base station,
wherein the resources for the number of the repetitive transmissions are associated with a same HARQ process identifier (ID),
wherein the HARQ process ID is identified based on the period information, the number of the HARQ process, and a symbol index of a first symbol of a first transmission of the repetitive transmissions, and
wherein in case that the RV sequence is 0-0-0-0, the identified resource is one among first F resources, except for a predetermined number of resources, and a number of the first F resources and the predetermined number of the resources is determined based on the number of the repetitive transmissions.

2. The method of claim 1, wherein the identified resource is based on time and frequency resource information included in the grant-free uplink transmission configuration information.

3. The method of claim 1, further comprising receiving, from the base station, downlink control information for activating the grant-free uplink transmission,
wherein the downlink control information is associated with a radio network temporary identifier (RNTI) for a grant-free transmission.

4. The method of claim 3, wherein the identified resource is based on uplink transmission configuration information included in the downlink control information.

5. The method of claim 1, wherein, in case that the RV sequence is 0-3-0-3, the identified resource is associated with an RV value 0.

6. A method performed by a base station in a wireless communication system, the method comprising:
transmitting, to a terminal, grant-free uplink transmission configuration information via higher layer signaling, the grant-free uplink transmission configuration information including a number of repetitive transmissions, a redundancy version (RV) sequence for a grant-free uplink transmission, a number of hybrid automatic repeat request (HARQ) process for the grant-free uplink transmission, and period information for the grant-free uplink transmission; and
receiving, from the terminal, an initial transmission of uplink data on a resource among resources for the number of the repetitive transmissions,
wherein the resources for the number of the repetitive transmissions are associated with a same HARQ process identifier (ID),
wherein the HARQ process ID is identified based on the period information, the number of the HARQ process, and a symbol index of a first symbol of a first transmission of the repetitive transmissions, and
wherein in case that the RV sequence is 0-0-0-0, the resource is one among first F resources, except for a predetermined number of resources, and a number of the first F resources and the predetermined number of the resources is based on the number of the repetitive transmissions.

7. The method of claim 6, wherein the resource is associated with time and frequency resource information included in the grant-free uplink transmission configuration information.

8. The method of claim 6, further comprising transmitting, to the terminal, downlink control information for activating the grant-free uplink transmission,
wherein the downlink control information is associated with a radio network temporary identifier (RNT1) for a grant-free transmission.

9. The method of claim 8, wherein the resource is associated with uplink transmission configuration information included in the downlink control information.

10. The method of claim 6, wherein, in case that the RV sequence is 0-3-0-3, the resource is associated with an RV value 0.

11. A terminal in a wireless communication system, the terminal comprising:
a transceiver; and
a controller coupled with the transceiver and configured to:

receive, from a base station, grant-free uplink transmission configuration information via higher layer signaling, the grant-free uplink transmission configuration information including a number of repetitive transmissions, a redundancy version (RV) sequence for a grant-free uplink transmission, a number of hybrid automatic repeat request (HARQ) process for the grant-free uplink transmission, and period information for the grant-free uplink transmission, identify a resource among resources for the number of the repetitive transmissions as an initial transmission based on the RV sequence, and perform the initial transmission of uplink data on the identified resource to the base station, wherein the resources for the number of the repetitive transmissions are associated with a same HARQ process identifier (ID), wherein the HARQ process ID is identified based on the period information, the number of the HARQ process, and a symbol index of a first symbol of a first transmission of the repetitive transmissions, and wherein in case that the RV sequence is 0-0-0-0, the identified resource is one among first F resources, except for a predetermined number of resources, and a number of the first F resources and the predetermined number of the resources is determined based on the number of the repetitive transmissions.

12. The terminal of claim 11, wherein the identified resource is based on time and frequency resource information included in the grant-free uplink transmission configuration information.

13. The terminal of claim 11, wherein the controller is further configured to receive, from the base station, downlink control information for activating the grant-free uplink transmission, and wherein the downlink control information is associated with a radio network temporary identifier (RNT1) for a grant-free transmission.

14. The terminal of claim 13, wherein the identified resource is based on uplink transmission configuration information included in the downlink control information.

15. The terminal of claim 11, wherein, in case that the RV sequence is 0-3-0-3, the identified resource is associated with an RV value 0.

16. A base station in a wireless communication system, the base station comprising:

a transceiver; and a controller coupled with the transceiver and configured to:

transmit, to a terminal, grant-free uplink transmission configuration information via higher layer signaling, the grant-free uplink transmission configuration information including a number of repetitive transmissions, a redundancy version (RV) sequence for a grant-free uplink transmission, a number of hybrid automatic repeat request (HARQ) process for the grant-free uplink transmission, and period information for the grant-free uplink transmission, and receive, from the terminal, an initial transmission of uplink data on a resource among resources for the number of the repetitive transmissions, wherein the resources for the number of the repetitive transmissions are associated with a same HARQ process identifier (ID), wherein the HARQ process ID is identified based on the period information, the number of the HARQ process, and a symbol index of a first symbol of a first transmission of the repetitive transmissions, and wherein in case that the RV sequence is 0-0-0-0, the resource is one among first F resources, except for a predetermined number of resources, and a number of the first F resources and the predetermined number of the resources is based on the number of the repetitive transmissions.

17. The base station of claim 16, wherein the resource is associated with time and frequency resource information included in the grant-free uplink transmission configuration information.

18. The base station of claim 16, wherein the controller is further configured to transmit, to the terminal, downlink control information for activating the grant-free uplink transmission, and wherein the downlink control information is associated with a radio network temporary identifier (RNTI) for a grant-free transmission.

19. The base station of claim 18, wherein the resource is associated with uplink transmission configuration information included in the downlink control information.

20. The base station of claim 16, wherein, in case that the RV sequence is 0-3-0-3, the resource is associated with an RV value 0.

* * * * *